(12) United States Patent
Siu et al.

(10) Patent No.: US 6,252,851 B1
(45) Date of Patent: Jun. 26, 2001

(54) METHOD FOR REGULATING TCP FLOW OVER HETEROGENEOUS NETWORKS

(75) Inventors: Kai-Yeung S. Siu, Charlestown, MA (US); Paolo L. Narvaez, Eatontown, NJ (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/049,814

(22) Filed: Mar. 27, 1998

Related U.S. Application Data

(60) Provisional application No. 60/070,644, filed on Jan. 7, 1998, and provisional application No. 60/041,626, filed on Mar. 27, 1997.

(51) Int. Cl.[7] ............... H04L 12/26; H04J 3/14
(52) U.S. Cl. ............ 370/236; 370/395; 370/414; 370/428
(58) Field of Search .................. 370/230, 231, 370/232, 233, 234, 235, 236, 252, 253, 249, 395, 400, 412, 428, 429, 414, 413

(56) References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 4,839,891 | * 6/1989 | Kobayashi et al. | 370/422 |
| 4,901,277 | 2/1990 | Soloway et al. | 364/900 |
| 5,014,265 | * 5/1991 | Hahne et al. | 370/235 |
| 5,042,029 | * 8/1991 | Hayakawa | 370/235 |
| 5,459,725 | * 10/1995 | Bodner et al. | 370/400 |
| 5,633,859 | 5/1997 | Jain et al. | 370/234 |
| 5,650,993 | * 7/1997 | Lakshman et al. | 370/236 |
| 5,959,995 | * 9/1999 | Wicki et al. | 370/400 |
| 5,974,028 | * 10/1999 | Ramakrishnan | 370/229 |
| 6,092,115 | * 7/2000 | Choudhury et al. | 709/325 |

OTHER PUBLICATIONS

Per Johansson et al., "Interaction Betweeen TCP Flow Control and ABR Rate Control," 1997 IEEE Pacific Rim Conference on Communications, Computers and Signal Processing, Aug. 20–22, 1997, pp. 455–464.

Victor Chim et al., "End–To–End Acknowledgments for Indirect TCP Over Wireless Internetworks," 1997 IEEE Pacific Rim Conference on Communications, Computers and Signal Processing, Aug. 20–22, 1997, pp. 774–777.

* cited by examiner

*Primary Examiner*—Ricky Ngo
(74) *Attorney, Agent, or Firm*—Hamilton, Brook, Smith & Reynolds, P.C.

(57) ABSTRACT

A method for regulating flow through a network node where forwarding of successive data packets from sources is dependent on receipt of acknowledgments from the destinations, the packets are buffered in a packet buffer as they arrive from their sources. Acknowledgments are withheld in an acknowledgment bucket, and are released such that successive data packets are buffered in the sources to avoid overflow of the packet buffer due to bandwidth limitations toward the destinations. The destination is typically in a bandwidth constrained network (BCN) while the source is in a local area network (LAN) using transmission control protocol (TCP). In a preferred embodiment the BCN operates in asynchronous transfer mode (ATM), and a transmission rate of the BCN is returned upon request. TCP source states are maintained by observing TCP traffic through the node. The behavior of TCP sources is predicted from traffic observations. Then, the known transmission rate of the BCN is translated to a timed sequence of acknowledgments releases based on the predicted behavior. Alternatively, an estimate is maintained of effective queue size, which includes data buffered in the packet buffer, and residual data packets, i.e., those data packets that have been requested but have not yet been received at the node. An acknowledgment is released if the effective queue size is less than a threshold, which may be dynamic.

28 Claims, 11 Drawing Sheets

METHOD FOR REGULATING TCP FLOW OVER HETEROGENEOUS NETWORKS

RELATED APPLICATIONS

This application claims the benefit of U.S. Provisional Application No. 60/041,626, filed Mar. 27, 1997, and also U.S. Provisional Application No. 60/070,644, filed Jan. 7, 1998, the entire teachings of which are incorporated herein by reference.

GOVERNMENT FUNDING

The invention was supported, in whole or in part, by a grant MIP-9357553 from National Science Foundation. The Government has certain rights in the invention.

BACKGROUND OF THE INVENTION

Most Internet data applications today use transmission control protocol (TCP) as the transport layer protocol. Since the Internet is becoming increasingly heterogeneous, most TCP traffic traverses a wide range of networks with different bandwidth characteristics. TCP traffic is typically generated from a source connected to a local area network (LAN) e.g. Ethernet, and is aggregated through an Internet protocol (IP) edge router to an access network that uses a different link layer technology such as Asynchronous Transfer Mode (ATM). Congestion at the edge router occurs when the bandwidth available in the access network cannot support the aggregated traffic generated from the LAN.

TCP is a connection-oriented transport protocol which is designed to work with any underlying network technology. TCP makes no assumption as to how the network processes the data it sends, and perform its own data recovery and flow control.

TCP packets can contain thousands of bytes, while ATM transmits cells of 53 bytes, of which only 48 contain data. Thus, TCP packets must be broken up at the network edge into tens or hundreds of cells in order to be transmitted over an ATM network. If any one of these cells is dropped for any reason, congestion in the network being one of the main causes, the entire packet is lost, even though all of the remaining cells may arrive at the destination intact. Valuable bandwidth is therefore wasted transporting these cells once one has been dropped. Compounding this problem, the entire packet must be re-transmitted, consuming even more bandwidth.

The TCP acknowledgment-based flow control mechanism is designed to slow down the source rate when the network becomes congested. TCP has no direct way of knowing when the network is congested. It can only indirectly detect congestion by keeping track of how many packets are lost. Packet loss is indicated by a failure to receive the appropriate acknowledgments, depending on the TCP version. When packets do get lost, the loss indicates that some queue in the network might have experienced overflow. Every time TCP detects a packet loss, it reduces its source rate to alleviate the congestion that could have caused the packet loss.

TCP's congestion control and error recovery, based on acknowledgments, are implemented by a dynamic window at the source. Every packet that is sent must be acknowledged by the destination. A congestion window size determines the number of unacknowledged packets that can be present in the network at any given time, and is initially set to one. Each packet includes a sequence number, so that packets arriving at the destination out of order can be reordered. A destination responds to an incoming packet by sending an acknowledgment back to the source. If a sequence number is skipped, the destination continues to return the same sequence number, resulting in duplicate acknowledgments.

In general, when a packet is acknowledged, the congestion window size increases, and when a packet is lost, the window size decreases, forcing the rate to decrease. Specifically, during the "slow-start" phase, the window is incremented by one for each acknowledgment received, so that during this phase, two packets are transmitted for each acknowledgment received, resulting in an exponential increase in the packet transmission rate.

After the window reaches some threshold, the "congestion-avoidance" phase is entered, in which the window is incremented by one for every w acknowledgments received, where w is the window size. Thus, in this phase, usually one packet is transmitted for each acknowledgment received, but occasionally (when w is incremented), two packets will be transmitted.

Finally, when a maximum limit is reached, the window size does not change, and one packet is released for every acknowledgment received. This is the "saturation" phase.

When a packet is lost, the congestion-avoidance threshold is set to one half the window size, and the window is reduced to one.

The available bit rate (ABR) service provided by ATM has been developed with the goal of minimizing switch buffer requirement and cell loss in transporting data and allowing users to have fair access to the available bandwidth in ATM networks. To achieve such service requirements, the ABR service uses congestion control at the ATM layer. Network switches must constantly monitor the traffic load and feed the information back to the sources. The sources are expected to adjust their input to the network dynamically, based on the congestion status of the network.

However, while ABR assumes that the end systems comply with the ABR source behavior, most current applications are only connected to ATM via legacy networks such as Ethernet and employ TCP which provides flow control at the transport layer.

While TCP handles network congestion and resulting packet loss quite effectively with its end-to-end window flow control mechanism, its throughput could be improved if intermediate routers of the access network could detect incipient congestion and explicitly inform the TCP source to throttle its data rate before any packet loss occurs. Such throughput improvement is particularly significant in a high latency access network environment such as an ATM-based network. However, while the ATM access network may have its own traffic control mechanism, its effect terminates at edge routers, e.g., at the interface between two networks, and consequently, the end-to-end performance is not improved. In fact, when different flow control mechanisms are employed simultaneously, in some cases TCP throughput can actually be reduced.

When transmitting TCP traffic over a network service such as ATM ABR, TCP's own flow control mechanism does not have direct knowledge of the network's flow control dynamics. Though an effective ABR rate control mechanism can determine the desired source rate into the ATM network, a TCP source not directly connected to an ATM network will send data at different rates according to its own dynamics. Thus, even if ABR's flow control can relieve congestion inside an ATM network, congestion can still occur at the network edges when TCP sources are sending data at a faster rate than the available bandwidth in the ATM network, requiring very large buffers at the network edges to avoid packet loss.

SUMMARY OF THE INVENTION

The present invention is a new efficient method for regulating TCP traffic over ATM and other networks with the objective of maximizing TCP throughput while minimizing the network-interface buffer requirement.

Accordingly, in a method for regulating flow through a network node where forwarding of successive data packets from sources is dependent on receipt of acknowledgments from the destinations, the packets are buffered in a packet buffer as they arrive from their sources. From the packet buffer, they are later forwarded to their destinations. Acknowledgments arriving from the destinations are withheld in an acknowledgment bucket, and are released to the sources such that the sources respond by transmitting new packets at a rate which avoids overflow of the buffer. As a result, successive data packets are effectively buffered in the sources to avoid overflow of the packet buffer due to bandwidth limitations toward the destinations.

In a preferred embodiment, the destination is in a bandwidth constrained network (BCN) while the source is in a local area network (LAN), preferably using transmission control protocol (TCP).

In a preferred embodiment the BCN operates in asynchronous transfer mode (ATM), and a transmission rate of the BCN is returned upon request.

TCP source states are maintained by observing TCP traffic through the node. The behavior of TCP sources is predicted from traffic observations. The known transmission rate of the BCN is then translated to a timed sequence of acknowledgment releases based on the predicted behavior.

In particular, the TCP source rate is matched to the ATM ABR explicit rate by controlling the flow of TCP acknowledgments at network interfaces. This embodiment has minimum buffer requirement, yet offers the same throughput performance as if the network-interface buffer were infinite. Moreover, the method is transparent to the TCP layer and requires no modification in the end system software or in the access network software except at the network interface.

In a high-latency network environment, the window flow control mechanism of TCP may not be very effective because it relies on packet loss to signal congestion, instead of avoiding congestion and buffer overflow. By the time the source starts decreasing its rate as a result of packet loss, the network has already been overly congested. In the present invention, the source reacts to congestion as it occurs and avoids lost packets.

Instead of holding packets at the edge buffer, the present invention slows down the TCP source by holding back acknowledgments, essentially transforming a buffer of data packets into a buffer of packet acknowledgments. Since the essential information contained in an acknowledgment is only a sequence number, this "acknowledgment buffer" may be only a list of numbers. To differentiate this type of buffering from the traditional packet buffer, we call it an acknowledgment, or ack, bucket.

By appropriately regulating the acknowledgment bucket, we can practically eliminate the packet buffer and still achieve the same output rate as if a packet buffer of unlimited size exists at the network edge. The advantage is that while storing one packet in the buffer might require a few kilobytes of memory, storing its acknowledgment in the bucket requires only a few bytes of memory, i.e. the size of a sequence number. In fact, because sequence numbers are sequential, only the highest acknowledgment sequence number received, as well as the sequence number of the last acknowledgment released, actually need to be stored in the acknowledgment bucket.

By controlling the flow of acknowledgments from the destination to the source, the ABR flow control is effectively extended all the way to the TCP source. The acknowledgment bucket serves as a translator which transforms the ABR explicit rate command into a sequence of TCP acknowledgments, and whose effect is to have the TCP source send data no faster than the ABR explicit rate.

The above embodiment works under the assumptions that 1) the TCP version is known and 2) an ABR explicit rate command is available at the network edge. Under these conditions, it is possible to guarantee that the packet buffer at the network edge will always be empty at steady state.

Alternatively, the acknowledgment bucket scheme is generalized to handle more general network environments regardless of the underlying link layer technologies, providing significant improvement in several ways. First, there is no explicit knowledge about the available bandwidth inside the access network. Second, these embodiments can be implemented without having to simulate the TCP source behavior, leading to drastic reduction in implementation complexity. Third, these embodiments can be applied to an aggregation of multiple TCP flows using only a first-in first-out (FIFO) queue, while achieving fairness in throughput among the flows.

Accordingly, in an alternate embodiment, an estimate is maintained of effective queue size, which includes data buffered in the packet buffer, and residual data packets, i.e., those data packets that have been requested but have not yet been received at the node. An acknowledgment is released if the effective queue size is less than a threshold.

In a preferred embodiment, if the TCP versions of the sources are known, the residual queue size at time t is calculated as the amount of data requested up to time t, less the amount of data received from the source by time t. The estimate of effective queue size at time t is then the sum of a value based on the actual queue size at time t, and the residual queue size at time t.

In another preferred embodiment, the estimate of residual queue size at time t is determined by counting acknowledgments released during an interval from $(t-\tau_{max})$ to t, where $\tau_{max}$ is a maximum round trip delay in the LAN.

In yet another preferred embodiment, the estimate of residual queue size at time t is determined by counting acknowledgments released during N consecutive intervals of duration $\tau_{max}/N$ ending at time t for some integer N. Each of the counts is maintained for a duration of $\tau_{max}$, where $\tau_{max}$ is a maximum of round trip delay in the LAN.

In still another embodiment, initializing an estimate of residual queue size is first initialized. The estimate is incremented by one when an acknowledgment is released, and is decremented by one when a packet arrives. The estimate is not decremented if its value is 0.

Alternatively, the threshold in any of the above embodiments changes dynamically and is dependent on the available bandwidth of the BCN.

Where the regulated traffic is aggregated from a plurality of TCP connections, the actual queue size is a count of all packets in the packet buffer. In a preferred embodiment, the estimate of residual queue size is a count of all packets which have been requested from all sources and which have not yet arrived at the packet buffer, effective queue size is the sum of the actual queue size and the estimate of residual queue size. Fairness is ensured among the different connections by having a separate bucket for each connection and releasing acknowledgments in a round-robin fashion.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION

Embodiment 1: ATM ABR

The acknowledgment bucket scheme of the present invention is based on the ability of an edge device to withhold acknowledgments returning to the TCP source. The edge device releases acknowledgments such that the source sends data no faster than the available rate in the ATM network.

We assume that the acknowledgment travels on its own. If the acknowledgment is contained in another data packet, the two can be separated into two different packets so that the acknowledgment can be withheld without stopping the reverse data traffic.

Figure 1:
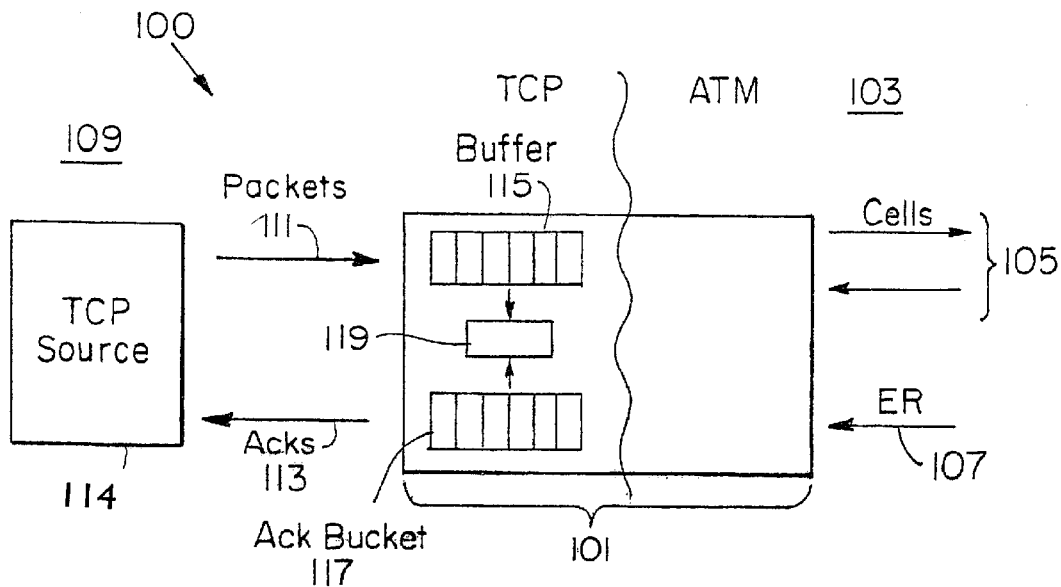
FIG. 1 is a system-level block diagram of the interface model for the ATM ABR embodiment of the invention.

FIG. 1 is a block diagram of an ATM ABR embodiment of the present invention. The edge device 101 sends and receives cells 104 from the ATM network 103. It also receives packets 111 and sends acknowledgments 113 to the TCP source 114 within a legacy network 109 such as Ethernet. The TCP packets 111 are segmented into ATM cells at the edge device 101 before being transmitted to the ATM network. For simplicity, assume that each TCP connection has only one edge device through which it can send data. Packets which have been received from the source and have not yet been sent to the ATM network are stored in the packet buffer 115. Acknowledgments which have been received from the destination through the ATM network and have not yet been sent to the source are stored in the acknowledgment bucket 117.

The edge device 101 serves as a virtual source for the ATM network. It periodically receives a resource management (RM) cell from the ATM network that contains an explicit rate (ER) command 107. If data is available at the packet buffer 115, the edge device 101 transmits to the ATM network at a data rate equal to ER. Because of the dynamic nature of the available bandwidth for ABR service, the ER command to the source changes continuously. As described below, the ER command is used to determine the rate at which acknowledgments can be released from the bucket 117.

In order to determine the forwarding rate for the acknowledgments, the edge device 101 needs to know the effect of a released acknowledgment 113 on the source. If the TCP source 114 has data to send in the time interval of interest, it responds to the arrival of an acknowledgment by transmitting one or two packets, depending on the congestion window size when the acknowledgment reaches the source. In order to predict the response of an acknowledgment, the edge device 101 must keep track of and predict the size of the congestion window at the instant the acknowledgment reaches the source. The congestion window is simply a limit to the number of outstanding unacknowledged packets allowed. It changes dynamically depending on the apparent congestion of the network. Congestion window size prediction is done with an observer 119 at the edge device.

The observer 119 estimates the congestion window size at the TCP source 114 by simulating, within the edge device 101 itself, the window dynamics of the TCP source 114. Because there are a number of different TCP implementations, the edge device 101 is assumed to have knowledge of which TCP version the source implements. For example, both TCP Tahoe and TCP Reno retransmit a packet upon a timeout. In addition, TCP Reno uses the fact that a TCP receiver sends back in an acknowledgment the last contiguous packet number it received, so that, for example, if it never receives packet 4 in a series of eight packets, it sends back a "3" in the acknowledgments for packets 5–8. TCP Reno responds to three of these duplicate acknowledgments by retransmitting packet 4.

Figure 2:
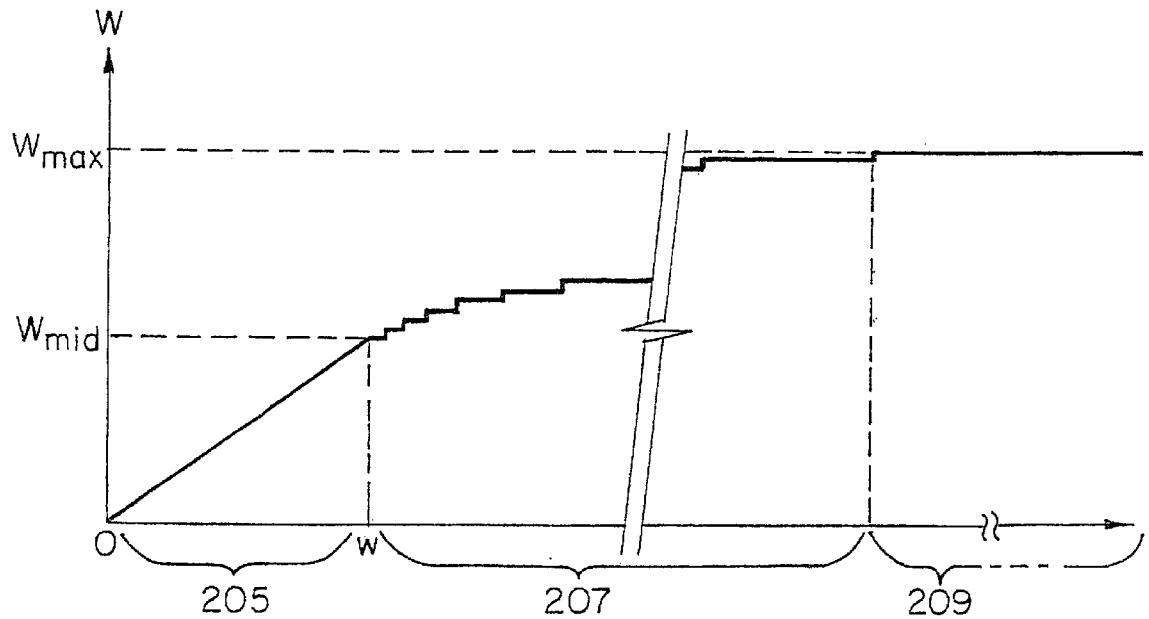
FIG. 2 is a graph showing the relationship between TCP congestion window size and the number of acknowledgments received.

When there is no packet loss, the dynamics of the congestion window at the TCP source is relatively straightforward. FIG. 2 is a graph showing the relationship between the congestion window size w 202 and the number of acknowledgments received 203 when there is no packet loss. First, when the window size w is less than some value $W_{mid}$, the window size increases by one every time a new acknowledgment arrives at the source. This is called the slow start phase 205.

When w is between $W_{mid}$ and some maximum value $W_{max}$, the window size increases from w to w+1 every time w acknowledgments arrive at the source. This is the congestion avoidance phase 207.

Finally, when w reaches the maximum $W_{max}$, w stops changing as long as packets do not get lost. This is the saturation phase 209.

The observer 119 (FIG. 1) predicts these window dynamics. When an acknowledgment is released by the edge device, the observer predicts what the window size at the source will be when that acknowledgment is received by the source. The observer is implemented at the edge device and is invoked every time an acknowledgment is released, as described in the pseudo-code below.

Observer:

```
{
  if (w < W_mid)              (slow start)
    w = w + 1
    return (1)
  elseif (W_mid ≤ w < W_max)  (congestion avoidance)
    w_rec = w_rec + 1
    if (w_rec == w)
      w = w + 1
      w_rec = 0
      return (1)
    else
      return (0)
  else                        (saturation)
    return (0)
}
```

During initialization, w is set to 1, and $W_{rec}$ is set to 0. $W_{max}$ is set to the maximum window advertised by the destination, and $W_{mid}$ is a parameter known to the edge device (e.g. half of $W_{max}$). As the pseudocode shows, in the slow-start phase, w is incremented by 1 each time an acknowledgment is released. In the congestion avoidance phase, $w_{rec}$ is a counter which counts w acknowledgment releases, at which time it is reset to 0 and w is incremented by one. In saturation phase, w does not change. In addition to keeping track of the window size w, the observer returns the increase in window size caused by the release of the last acknowledgment.

Once the edge device 101 predicts the change in the source's congestion window size, it can translate the ATM explicit rate command into a sequence of acknowledgment releases. A rate translator transforms ABR's explicit rate command into an appropriately timed sequence of acknowledgments. The translator keeps track of all data $R_{TCP}$ which has been requested by the network edge through previously released acknowledgments. This information is obtained from the observer 119.

The translator also keeps track of the amount of data $R_{ATM}$ (corresponding to the ABR explicit rate) requested by the ATM network as well as the amount of data $R_{TCP}$ requested from the TCP network through acknowledgment release. To be more specific, $R_{ATM}$ is increased at the rate specified by the explicit rate (ER) as long as the acknowledgment bucket is nonempty. If there is no acknowledgment left, the TCP source cannot send any data and the explicit rate command will be ignored ($R_{ATM}$ will remain unchanged in this case). The TCP request $R_{TCP}$ is increased by 1 every time an acknowledgment is released. Furthermore, if the observer 119 returns a value of 1, i.e., the window size increases by one, $R_{TCP}$ is also incremented by one packet. Whenever $R_{ATM} > R_{TCP}$, the edge device will release an acknowledgment from the bucket so as to increase $R_{TCP}$ to match $R_{ATM}$. Thus, the packet buffer at the network edge is maintained virtually empty while maximizing throughput.

The following pseudocode demonstrates a preferred implementation of the translator:

```
while there are acks in the bucket
{
  R_ATM = R_ATM + ER × (t − τ)
  τ = t
  if (R_ATM > R_TCP)
    release an acknowledgment
    R_TCP = R_TCP + 1
    if (observer returns 1)
      R_TCP = R_TCP + 1
}
```

For convenience, the units for data are specified in terms of number of packets. If the packets have different sizes, the same ideas still hold by using the TCP octet rather than the IP packet as the data unit.

While there are acknowledgments in the acknowledgment bucket, $R_{ATM}$ is incremented by ER×(t−τ) where (t−τ) is the period from the last execution of the algorithm (time τ) to the present time t. If $R_{ATM}$ is greater than $R_{TCP}$, an acknowledgment is released and $R_{TCP}$ is incremented by one. The observer is executed to update the TCP window simulator. If the observer returns a 1, i.e., the TCP window size w has increased, the TCP network can send a second packet, and so $R_{TCP}$ is incremented a second time.

The discussion of the acknowledgment bucket scheme so far assumes that there is no packet loss in the network. However, when there is packet loss in the network, the source congestion window behaves in a more complicated way and the observer 119 must be modified accordingly.

The TCP source 114 (FIG. 1) holds a timer for every packet that it sends in order to estimate the roundtrip delay between itself and the destination. Based on the roundtrip delay and its variance, the source computes the maximum time interval (RTO) within which a previously sent packet can remain unacknowledged. If a packet remains unacknowledged for more than RTO, the timer expires. $W_{mid}$ is reduced to one-half the window size, or w/2, and the window size w is reduced to one packet. The first unacknowledged packet is resent. If the TCP source implements the fast retransmit mechanism and receives duplicate acknowledgments (typically four of the same kind), it will also reduce its window size and resend the first unacknowledged packet.

Instead of trying to simulate these complicated dynamics in the observer, a simple measurement can be used to signal the observer when it should change phase. A detector at the edge device reads the sequence number of the packets arriving from the source. During normal operation the sequence numbers are in consecutive order. However, if the sequence number of a packet received at the edge device is the same as that of some packet previously received, the source is retransmitting, and the detector triggers the observer to reset its states, i.e., $W_{mid}=w/2$, $w=1$.

Note that this reset function is valid only if the source is using TCP Tahoe. If the source uses a version of TCP which uses fast recovery, e.g., TCP Reno, the reset function must be modified accordingly.

This acknowledgment holding scheme can be used by any network (not necessarily ATM) trying to regulate the flow from a source that responds to information from the destination. By determining how the source transmission rate reacts to the information sent by the destination, the network can manipulate such information (including withholding it) to effectively force the source to send data at the network's desired rate.

We now analyze and compare the dynamic behavior of TCP with and without an acknowledgment bucket. The focus is where the available bandwidth in the ATM network can be fully utilized by the TCP source. If the TCP source cannot fully utilize the link bandwidth, the edge buffer will be empty and the acknowledgment bucket will have no effect. To simplify the analysis, a fluid approximation of the traffic flow is used.

Figure 3:
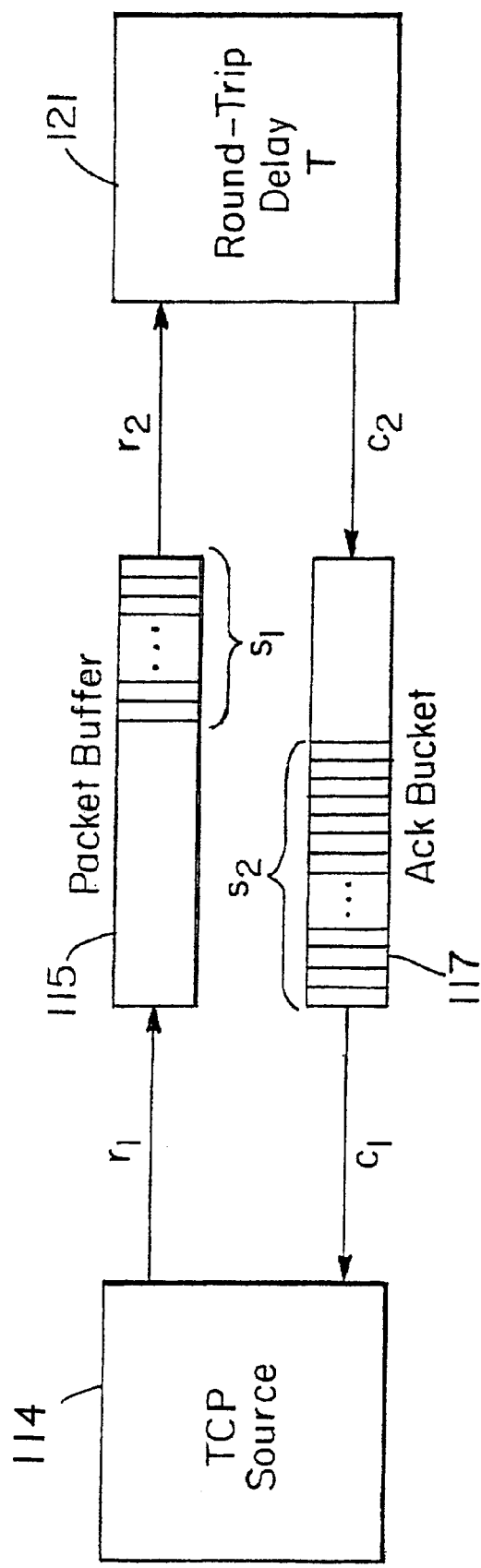
FIG. 3 is a block diagram representation of TCP dynamics of the invention.

FIG. 3 is a block diagram representation of TCP dynamics, showing the TCP source 114, packet buffer 115, and ack bucket 117. Variables $r_1$, $r_2$, $c_1$, and $c_2$ correspond to the various rates entering and leaving these components as indicated. Between the buffer 115 and the bucket 117 there is a delay 121 that represents the round-trip time that it takes for TCP data to reach the destination and for an acknowledgment to return to the ack bucket 117, i.e., $c_2(t)=r_2(t-T)$.

TCP source behavior can be characterized by the following state-space representation:

$$\dot{w}(t) = \begin{cases} c_1(t) & \text{if } w < W_{mid} \quad \text{(slow start)} \\ c_1(t)/w & \text{if } W_{mid} \leq w < W_{max} \quad \text{(congestion avoidance)} \\ 0 & \text{if } w = W_{max} \quad \text{(saturation)} \end{cases} \quad (1)$$

$$r_1(t) = c_1(t) + \dot{w}(t) \quad (2)$$

The packet buffer is a limited integrator that is drained by the ATM explicit rate (ER). The size of the packet buffer is denoted by $s_1$. Its state-space description is:

$$\dot{s}_1(t) = \begin{cases} r_1(t) - ER(t) & \text{if } s_1 > 0 \text{ or } r_1(t) > ER(t) \\ 0 & \text{if } s_1 = 0 \text{ and } r_1(t) \leq ER(t) \end{cases} \quad (3)$$

$$r_2(t) = \begin{cases} ER(t) & \text{if } s_1 > 0 \\ 0 & \text{if } s_1 = 0 \end{cases} \quad (4)$$

Finally, the ack bucket is also a limited integrator that is drained according to the rate translator. The size of the ack bucket is denoted by $s_2$. The state-space description is:

$$\dot{s}_2(t) = \begin{cases} c_2(t) - c_1(t) & \text{if } s_2 > 0 \text{ or } c_2(t) > c_1(t) \\ 0 & \text{if } s_2 = 0 \text{ and } c_2(t) \leq c_1(t) \end{cases} \quad (5)$$

$$c_1(t) = \begin{cases} ER(t)/2 & \text{if } s_1 > 0 \text{ and } w(t) < W_{mid} \quad \text{(slow start)} \\ \dfrac{ER(t)}{1 + 1/w(t)} & \text{if } s_1 > 0 \text{ and } W_{mid} \leq w < W_{max} \quad \text{(congestion avoidance)} \\ ER(t) & \text{if } s_1 > 0 \text{ and } w(t) = W_{max} \quad \text{(saturation)} \\ 0 & \text{if } s_1 = 0 \end{cases} \quad (6)$$

Note that during the congestion avoidance phase, the translator sends only the amount of acknowledgments that will cause the source to send data at rate $r_1(t)=ER(t)$. Using the fluid approximation and equations (1) and (2), we can determine that during this phase, the translator will send acknowledgments at the rate specified by equation (6).

There are two major modes of operation for TCP over ATM. The available bandwidth can be either under-utilized or fully utilized. Under-utilization is not of much interest because under-utilization of the link means that there is no congestion and neither the packet buffer nor the ack bucket is used for any extended period of time. Since the queue or bucket size is practically zero, TCP will perform in the same way regardless of whether it has an acknowledgment bucket or not.

The more interesting case of full link utilization is easy to analyze because the flow of data in the ATM link follows exactly the ABR explicit rate. Suppose the explicit rate is a constant ER over a period of time, then $r_2=c_2=ER$. Depending on the TCP window size w, the system could be operating in any of the three phases of operation: slow start, congestion avoidance, or saturation. We compare the behavior of TCP with and without ack holding in each of the three phases, assuming that the available bandwidth can be fully utilized by the TCP source.

If a TCP source sends at the ABR explicit rate before its window size reaches $W_{mid}$, it is operating in the slow start phase. If $t_0$ denotes the time when the available bandwidth is fully utilized, the evolution of window size and the various rates in the two different schemes can be solved analytically. When no acknowledgment bucket is used, $c_1=c_2$.

Slow-Start Phase:

| No Ack Bucket | With Ack Bucket |
|---|---|
| $c_1(t) = ER$ | $c_1(t) = ER/2$ |
| $\dot{w} = c_1 = ER$ | $\dot{w} = c_1 = ER/2$ |
| $w(t) = w(t_0) + ER \times (t - t_0)$ | $w(t) = w(t_0) + ER/2 \times (t - t_0)$ |
| $r_1(t) = c_1 + \dot{w} = 2\,ER$ | $r_1(t) = c_1 + \dot{w} = ER$ |
| $s_1(t) = ER \times (t - t_0)$ | $s_1(t) = 0$ |
| $s_2(t) = 0$ | $s_2(t) = (ER/2) \times (t - t_0)$ |
| (7) | (8) |

Observe how the ack bucket is able to regulate the TCP flow (so that it complies with the ATM ER) without having to make use of the packet buffer ($s_1=0$). Furthermore, in this phase, the rate of increase in the ack bucket size $s_2$ with ack holding is only half of that of the packet buffer size s, without ack holding.

For congestion avoidance phase, let t, be the first time the TCP connection fully utilizes its link bandwidth and has a window w larger than $W_{mid}$. We can solve for the evolution of the window and queue sizes and the various rates as follows.

Congestion Avoidance Phase:

| No Ack Bucket | With Ack Bucket |
|---|---|
| $c_1(t) = ER$ | $c_1(t) = ER/(1 + 1/w(t))$ |
| $w = ER/w(t)$ | $w = ER/(w(t) + 1)$ |
| $w(t) = \sqrt{2ER(t-t_1) + w^2(t_1)}$ | $w(t) = -1 + \sqrt{2ER(t-t_1) + (1+w(t_1))^2}$ |
| $r_1(t) = ER \times (1 + 1/w(t))$ | $r_1(t) = ER$ |
| $s_1(t) = w(t) - (ER \times T)$ | $s_1(t) = 0$ |
| $s_2(t) = 0$ | $s_2(t) = w(t) - (ER \times T)$ |
| (9) | (10) |

From the expressions for w(t) and w(t), it is also clear that when an ack bucket is used, its size, $s_2$, grows slower than the size of the packet buffer $s_1$ when no ack bucket is used.

In the saturation phase, regardless of whether the link bandwidth is fully utilized or whether we are using an ack bucket or not, all the states of the system reach steady state. If the link is fully utilized, the TCP source will send data at the ABR explicit rate. The window size will stop changing and the packet buffer and ack bucket will stop growing. During window saturation, the ack bucket size is the same as the packet buffer size would be when no ack bucket is used.

In all three phases of TCP operation, the ack bucket grows no faster than the corresponding packet buffer would grow with no ack bucket. Therefore, whenever there is congestion and the link bandwidth is fully utilized, acknowledgment holding never increases the total number of data elements (packets and acknowledgments) that need to be stored in the network. Rather withholding acknowledgments shifts the burden of retention from the packet buffer to the ack bucket, decreasing dramatically the physical memory requirements. While storage for a packet might require several Kbytes of memory, an acknowledgment only requires a few bytes, i.e., the size of a TCP sequence number.

The ack bucket can also be thought of as a network element that increases the round-trip delay seen by the source. In TCP (or other window-based protocols), increasing the round-trip delay has the effect of slowing down the source rate. Therefore, an increase in buffer size $s_1$ (and thus an increase in queuing delay) will automatically decrease the source's sending rate. However, increasing the round-trip delay to slow down the source can also be achieved by the acknowledgment bucket of the present invention. In fact, increasing the round-trip delay can be accomplished by slowing down a packet or acknowledgment anywhere in the network. Regulating current TCP flow without changing the source and destination behavior necessarily requires manipulating and changing the round-trip delay. It is to our advantage to control the round-trip delay where it is easiest. An acknowledgment bucket at the edge device is an ideal place.

This embodiment (Embodiment 1) assumes the network model in FIG. 1 where a bandwidth-constrained (BC) network uses an ATM ABR service and the round trip delay time in the LAN is negligible. Embodiment 1 also assumes the following: 1) the TCP version is known and 2) an ABR-type explicit rate command is available at the network edge. Because TCP is a deterministic protocol, the network edge can determine precisely how it should release acknowledgments in such a way that the TCP source will comply with ABR's command when the acknowledgments arrive at the source.

The constraint that the ATM subnetwork imposes on the network edge is that at a time period T after receiving an explicit rate (ER) command, the data rate entering the ATM network cannot be greater than the ER command.

There is some additional implementation complexity when an acknowledgment is piggy-backed in another data packet traversing in the backward direction. In this case, the network edge first extracts the sequence number of the acknowledgment from the packet. Then, it turns the acknowledgment validity bit off and recomputes the CRC accordingly, so that the TCP source will ignore the acknowledgment information. The recomputed packet with the data portion remaining intact is then forwarded to the source. When the network edge wants to release the acknowledgment, it simply creates a packet that contains the appropriate acknowledgment information and sends it to the source.

General Network Model

We now expand the acknowledgment bucket concept to a general network model. Alternative embodiments assume that TCP traffic originates in some local area network (LAN) and is aggregated through an edge router to an access network where bandwidth is more limited and delay is larger than the LAN. For convenience, the access network is referred to as the bandwidth constrained (BC) network.

Figure 4:
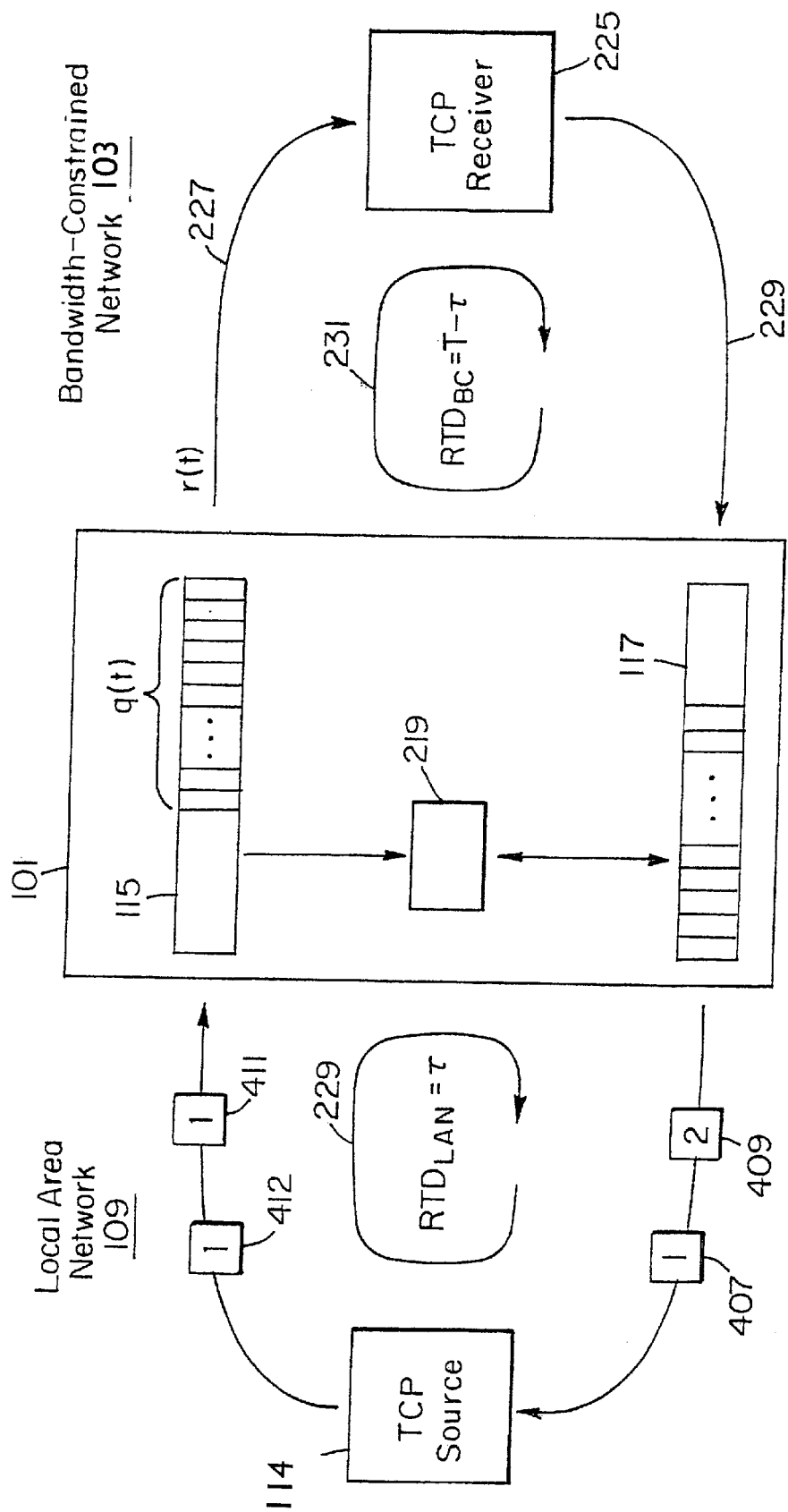
FIG. 4 is a block diagram illustrating a general network model of the invention.

FIG. 4 illustrates the basic network model. A TCP source 114 sends data from the LAN 109 to the BC network 103. The network edge 101 receives TCP packets 411, 412 from the LAN, buffers them if necessary in the packet buffer 115, and then transmits them to the BC network 103. When a TCP receiver 225 receives its packets 227, it returns acknowledgments 229 for the packets to the source 215. On the way back, the acknowledgments pass through the network edge 101, which can withhold them for some time in the acknowledgment bucket 217.

The LAN is assumed to have sufficiently large bandwidth and no restrictions are imposed as to how fast data packets and acknowledgments can flow between the TCP source and the network edge. On the other hand, the BC network imposes constraints on the bandwidth available from the network edge to a TCP receiver. In other words, the limited bandwidth in the BC network constrains how fast the packet buffer at the network edge can be drained. The available bandwidth or available rate r(t) for a TCP connection is the rate at which the edge can transmit the packets in its buffer to the BC network. Here, there is no explicit knowledge about the available rate for any TCP connection. The objective of the present invention is to maximize TCP throughput, while minimizing the buffer requirement at the network edge. The round-trip delay (RTD) time 229 in the LAN is denoted by $\tau$ and that of the whole network is denoted by T, so that the delay 231 caused by the BC network is T−$\tau$. Though these two parameters can vary with time, we assume they have upper bounds, which are denoted by $\tau_{max}$ and $T_{max}$, respectively.

Whereas Embodiment 1 (ATM ABR) assumes that the desired source rate is known through an explicit rate command from the BC network, no such assumption is made in the general network model embodiments described below, which make use of queue or buffer length to determine the desired source rate. Performance bounds are derived in terms of maximum queue length and guaranteed throughput.

The basic scheme is based on the effective queue size $q^*(t)$ at the network edge 215, defined as the sum of the actual queue size q(t) and the total amount of data that has been requested through acknowledgment release but has not yet arrived at the network edge. We refer to the latter (the amount of data requested but not received) as the residual queue size $q_{res}(t)$, so that $q^*(t)=q(t)+q_{res}(t)$.

More formally, the residual queue size at time t, $q_{res}(t)$, is the total amount of data contained in the packets in transit between the source and the edge at time t plus the total amount of data that will be transmitted by the source after time t triggered by the acknowledgments that are in transit between the edge and the source at time t.

Figure 5:
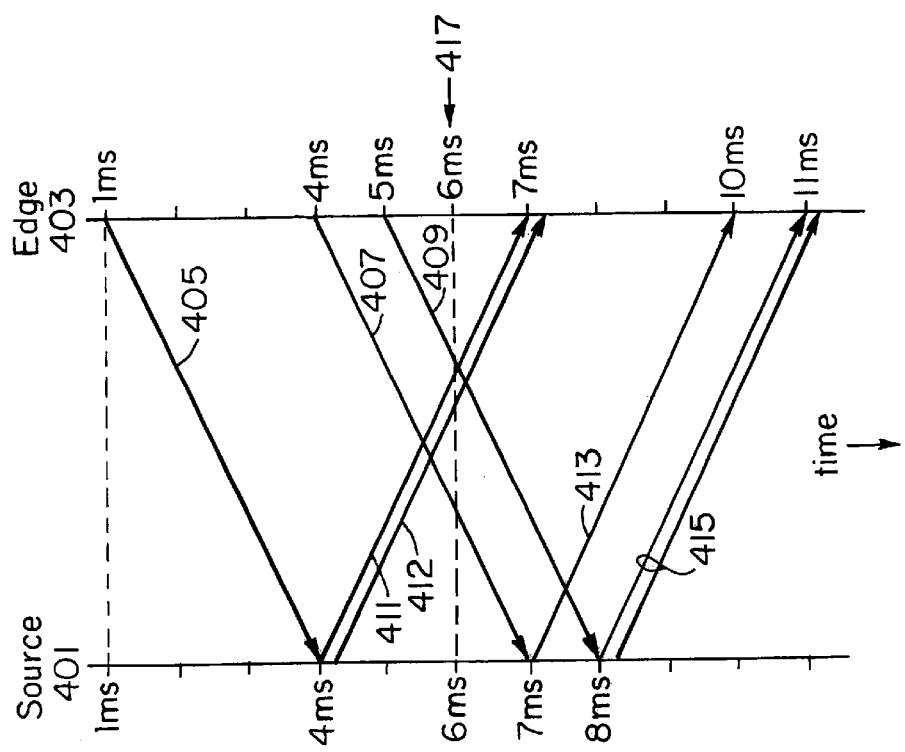
FIG. 5 is a timing diagram showing packets and acknowledgments passing between a TCP source and a network edge, and is used to demonstrate the concept of residual queue size.

For example, FIG. 5 is a timeline showing signals passing between the source 401 and the network edge 403. Suppose the delay from the source to the network edge as well as that from the edge to the source is 3 ms. At times 1 ms, 4 ms, and 5 ms the edge releases an acknowledgment 405, 407, 409 respectively. The first acknowledgment 405 reaches the source at time 4 ms and triggers the source to send two packets 411, 412. The second acknowledgment 407 reaches the source at time 7 ms and causes the source to send one packet 413. The final acknowledgment 409 reaches the source at 8 ms and triggers two packets 415. At time 6 ms 417, two packets 411, 412 are in transit between the source and the edge and two acknowledgments 407, 409 are in transit between the edge and the source, one 409 of which will trigger the release of two packets 415. Therefore at time 6 ms, the residual queue has a size of five packets. Packets 411, 412 and acknowledgments 407, 409 are shown in transit in FIG. 4. The numbers in the packets and acknowledgments, 1, 1, 1 and 2 correspond to the contribution, of packets and acknowledgments respectivley, to the residual queue size.

Since the round trip delay of the LAN is time-varying and the exact TCP source behavior might not be known, the effective queue size $q^*(t)$ cannot be determined precisely. Therefore, various ways of estimating the effective queue size are presented. For the moment, assume that there is some algorithm giving an estimate $q^*_{est}(t)$ of the effective queue size with an estimation error bounded as follows:

$$\alpha q^*(t) \leq q_{est}^* \leq \beta q^*(t) \quad (11)$$

where $0 < \alpha \leq 1 \leq \beta$ are constants.

The basic scheme operates by first setting a queue threshold $Q_{th}$ at the network edge to be some positive constant. Whenever the effective queue estimate $q^*_{est}(t)$ is smaller than the threshold $Q_{th}$, an acknowledgment is released. The operation of the basic scheme is described as follows:

The Basic Scheme

```
while # acks > 0
    update q+est(t)
    if (q+est(t) < Qth)
        Release An Acknowledgment
```

The basic scheme aims to maintain the effective queue size to be close to but smaller than the predetermined queue threshold. As long as there are acknowledgments in the ack bucket, an estimate of the effective queue size $q^*_{est}(t)$ is determined according to some algorithm. If this estimate is less than the predetermined threshold $Q_{th}$, an acknowledgment is released. Effective queue size is used rather than the actual queue size to eliminate possible instability caused by the link delays. Furthermore, introducing the effective queue allows us to prove performance bounds in terms of $Q_{th}$ and the maximum round trip delay in the LAN. The following is a key lemma that is used to derive the performance bounds.

Lemma 1

If during the time interval between $t_1$ and $t_2$, no acknowledgment is released at the network edge and no TCP timer retransmission takes place at the source, the effective queue size cannot increase during that interval, i.e., $q^*(t_2) \leq q^*(t_1)$ Proof:

Let $D(t_1,t_2)$ be the amount of data received at the network edge between time $t_1$ and $t_2$. Since no new acknowledgment is released during that time interval and no timer retransmission takes place, there is no new data in transit. Consequently, the residual queue size will decrease by $D(t_1,t_2)$, i.e., $q_{res}(t_2)=q_{res}(t_1)-D(t_1,t_2)$. Similarly, the actual queue size can at most increase by $D(t_1,t_2)$, i.e., $q(t_2) \leq q(t_1)+D(t_1,t_2)$. Therefore, the effective queue size cannot increase, i.e., $q^*(t_2)=q_{res}(t_2)+q(t_2) \leq q^*(t_1)$.

The following theorem gives a worst-case upper bound on the actual queue size of the basic scheme in terms of the error bound in estimating the effective queue size. Informally, the theorem implies that a constant-factor lower bound on the estimate of the effective queue size yields an actual queue size that is no larger than the queue threshold by the same factor.

Theorem 1:

Suppose the error in estimating the effective queue size is bounded below as follows: $q^*_{est}(t) > \alpha q^*(t)$ ($0 < \alpha \leq 1$) whenever $q^*(t) \geq Q_{th}/\alpha$, and TCP source timer retransmission does not occur. Then the basic scheme guarantees that the actual queue size $q(t)$ at the network edge is at most $\max\{q^*(0), Q_{th}/\alpha+s\}$, where s is the size of a TCP packet.

Proof:

Suppose on the contrary that $q(t_1) > Q_{th}/\alpha+s$ and $q(t_2) > q^*(0)$. Since $q_{res}(t)$ is non-negative, $q^*(t)=q(t)+q_{res}(t) \geq q(t)$. Therefore, $q^*(t_2) > Q_{th}/\alpha+s$ or equivalently, $q^*(t_2) \geq Q_{th}/\alpha+2s$. Since $q^*(t_2) > q^*(0)$, there must exist a latest time $t_1$ such that $0 \leq t_1 < t_2$ and $q^*(t_1) \geq q^*(t_2)$, i.e., $q^*(t_1)+s \leq q^*(t)$. Since the effective queue size can be incremented by at most 2 packets at a time, $q^*(t_1) \geq q^*(t_2)-2s \geq Q_{th}/\alpha$. Likewise, $q^*(t') \geq Q_{th}/\alpha$ for $t_1 \leq t' \leq t_2$.

Because of the assumed error bound in estimating $q^*(t)$, it follows that $q^*_{est}(t') \geq \alpha q^*(t') \geq Q_{th}$ for $t_1 \leq t' \leq t_2$. Consequently, no acknowledgment will be released between time $t_1$ and $t_2$ according to the basic scheme. By the result of Lemma 1, $q^*(t)$ cannot increase from time $t_1$ to $t_2$. This contradicts the previous statement that $q^*(t_1) < q^*(t_2)$.

Before deriving the worst-case bounds for throughput at the network edge using the basic scheme, we first give a definition of throughput over a time interval and introduce the notion of a guaranteed rate.

The throughput $Th(t,T)$ of a connection at the network edge over a period T ending at time t is defined as the total amount of data that is transmitted from the queue at the network edge during the interval of time between $t-T$ to $t$, divided by T:

$$Th(t, T) = \frac{1}{T} \sum \text{(packets serviced at } t') \times \text{packet size}, \quad (12)$$

Let $r(t)$ be the available bandwidth in the BC network. Given a persistent TCP source, the guaranteed rate of the TCP connection at the edge router is the highest R such that its throughput $Th(t,T)$ satisfies the following inequality:

$$\forall t, T > 0: Th(t, T) \geq \frac{1}{T}\left[\int_{t-T}^{t} \min(r(t), R)\,dt - R \times \tau_{\max}\right] \quad (13)$$

Note that the guaranteed rate R is defined with respect to a persistent TCP source. It can be interpreted as the minimum amount of the available bandwidth $r(t)$ that a TCP source can utilize at any time. In other words, if the available rate during some interval of time is $r(t)$, the queue will eventually service at least $\min(R,r(t))$ more data. The ($R \times \tau_{max}$) term is included to account for the lack of data being serviced during the initial round-trip delay.

The following theorem gives a worst-case bound on the guaranteed rate in terms of the queue threshold $Q_{th}$ and the maximum round trip delay in the LAN. First we define a packet as an early packet at time t if it is present in the router's queue at time t and its transmission was triggered by an acknowledgment released after time $t-\tau_{max}$. The number of early packets at time t is referred to as n(t).

Theorem 2:

Suppose the error in estimating the effective queue size is bounded above as follows: $q^*_{est}(t) \leq \beta(q^*(t)+n\pi(t))$ ($\beta \geq 1$). Then, whenever the acknowledgment bucket is non-empty, the basic scheme achieves a guaranteed rate of at least $R = Q_{th}/(\beta\tau_{max})$.

Proof:

Assume that 1) the available bandwidth r(t) is constant and has value $Q_{th}/(\beta\tau_{max})$ and 2) the roundtrip delay $\tau$ is constant and has value $\tau_{max}$. From assumption 2, we conclude that the effective queue bound is $q^*_{ext}(t) > \beta q^*(t)$. Now, we let $D(t_1, t_2)$ be the amount of data transmitted by the edge router between time $t_1$ and $t_2$. Under the two assumptions, the amount of data that is serviced $D(t_0, t_0+T)$ in an interval of time T (when the TCP sources are persistent) by using the basic scheme can be computed analytically, and it is easy to show that it is at least:

$$D(t_0, t_0+T) \geq \frac{Q_{th}}{\beta\tau_{max}}(t-\tau_{max}) \quad (14)$$

The minimum takes place when the there are no acknowledgments or packets in transit at time $t_0$. Now we relax somewhat the first assumption by allowing r(t) to be less than ($Q_{th}/\beta\tau_{max}$) during some time intervals. It is easy to see that some of the data that was serviced in the previous case might lose the chance of being serviced with a lower available rate. However, for a given interval T, the largest possible decrease in serviced data is int $(Q_{th}/\beta\tau_{max}-r(t))dt$. Therefore, the total serviced data must be at least $$D(t_0, t_0+T) \geq \min\left(\frac{Q_{th}}{(\beta\tau_{max})}, r(t)\right) \quad (15)$$

$$(T-\tau_{max}) \geq \min\left(\frac{Q_{th}}{(\beta\tau_{max})}, r(t)\right)T - \frac{Q_{th}}{\beta}$$

Now, we relax the second assumption completely so that r(t) can be greater than $Q_{th}/\beta\tau_{max}$ during other intervals of time. It is easy to show that by increasing the available rate it is not possible to decrease the total serviced data $D(t_0, t_0+T)$. Therefore, inequality (15) still holds.

Finally, we relax the second assumption and allow the roundtrip time $\tau$ to be less than the maximum $\tau_{max}$. A smaller round trip delay will speed up the arrival of packets (increasing throughput), but might also increase the effective queue size estimate (decreasing throughput) since $\pi(t)$ is no longer zero. If we analyze the tradeoff in the context of the basic scheme, we see that for every n packets that are early during some time interval $\tau_e$ the effective queue size estimate $q^*_{est}$ is incremented at most by $\beta n$ packets, delaying the transmission of n packets during the same interval $\tau_e$. The earliness of the early packets compensates for the lateness of the packets that are delayed. Therefore, inequality (15) still holds. Since $Q_{th}/\beta\tau_{max}$ satisfies the conditions in the definition of the guaranteed rate, $R = Q_{th}/(\beta\tau_{max})$ is a lower bound for the guaranteed rate.

We now describe various embodiments in which the effective queue size can be estimated. Each estimate is used in conjunction with the basic scheme to yield a different algorithm. The theorems established previously are used to derive performance bounds for each one of the algorithms.

Embodiment 2: With Knowledge of TCP Version

Figure 6:
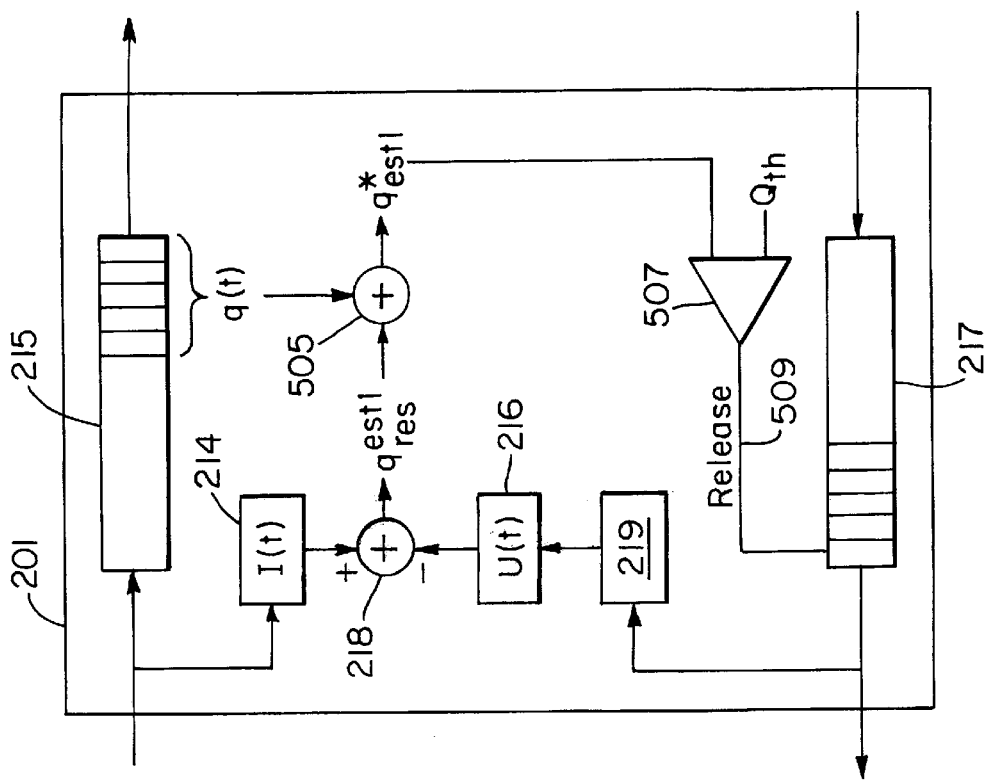
FIG. 6 is an schematic diagram of a network system illustrating an general network embodiment of the present invention having a knowledge of the TCP version.

FIG. 6 is a schematic diagram similar to FIG. 4 illustrating a preferred embodiment of the present invention where the bandwidth-constrained network is not necessarily ATM, but where the edge device has a knowledge of the TCP version 231. When the TCP version is known, the effective queue size can be estimated quite accurately. The estimation makes use of the TCP observer 219 as discussed above and keeps account of the actual queue size q(t) and the amount of data being received at the network edge 201 from the source 109.

Let U(t) 212 denote the total amount of data that has been requested by the network edge through acknowledgment release up to time t. With knowledge of the TCP version, U(t) can be computed precisely by the observer 219. Let I(t) 214 denote the total amount of data received at the network edge from the source by time t. The residual queue estimate $q_{res}^{est1}$ is the difference of the two, U(t)–I(t), calculated at 218. The estimate of the effective queue size $q_{est1}^*$ is then obtained by adding the residual queue estimate $q_{res}^{est1}$ to the actual queue size q(t) at 505. Finally, at comparator 507, the effective queue size $q_{est1}^*$ is compared with threshold $Q_{th}$, and if $q_{est1} < Q_{th}$, a release command 509 releases an acknowledgment from the ack bucket 217.

Therefore, the estimated residual size and effective queue size are respectively:

| | |
|---|---|
| $q_{res}^{est1}(t) = U(t) - I(t)$ | (16) |
| $q_{est1}^+(t) = q(t) + q_{res}^{est1}(t)$ | (17) |

As long as there is no error in the TCP observer, the above estimate of the effective queue size is exact, i.e, $q^*_{est1}(t) = q^*(t)$. Using Theorems 1 and 2, the following performance bounds can be derived for this embodiment:

The maximum actual queue size is: $q(t) \geq Q_{th}$,

The guaranteed rate is: $R \geq Q_{th}/T_{max}$.

Note that in most cases, the maximum delay $\tau_{max}$ of the LAN is orders of magnitude less than the delay of the entire connection. Therefore, for a given guaranteed rate R, the amount of buffer $R \times \tau_{max}$ that this scheme requires is much less than the case when no mechanism is implemented at the network edge. In the latter case, if the same guaranteed rate R is desired, it is easy to show that the TCP connection could use up to $R \times T$ amount of buffer in the worst case.

Without Knowledge of TCP Version

In practice, it may not be feasible for the edge router to know the TCP version used by each source. It can then be assumed that the TCP source will send either one or two packets after receiving an acknowledgment. (All existing versions of TCP behave in this way.) It is no longer possible to predict exactly how many packets the source will send.

Although it is no longer possible to have an exact estimate of the effective queue, a reasonable estimate is attainable. The actual queue size can still be measured directly. However, the residual queue can no longer be obtained by simply keeping account of the total amount of data requested U(t) and data received I(t) because of the uncertainty in computing U(t); otherwise, the accumulated error in U(t) will cause the error in estimating the effective queue size to be unbounded.

Therefore, in the next three embodiments, the residual queue size $q_{res}(t)$ is estimated. The three embodiments are described in order of decreasing computational complexity.

Embodiment 3: One Timer with Unlimited Number of States

Figure 7A:
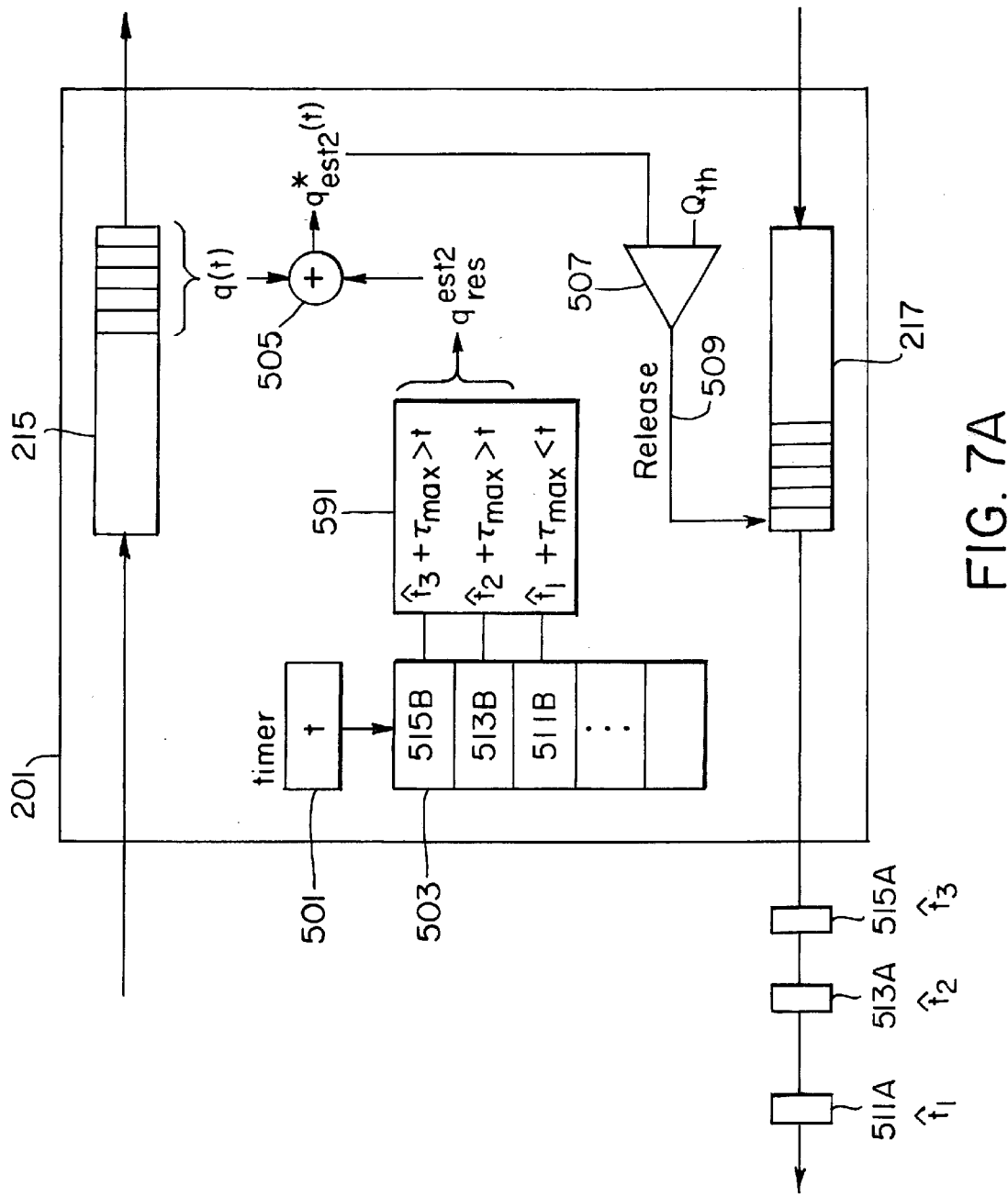
FIG. 7A is a schematic diagram illustrating a preferred embodiment of the present invention for a general network, having no knowledge of the TCP version, and having one timer with an unlimited number of states.

FIG. 7A is a schematic diagram of a general network embodiment having no knowledge of the TCP version, and having one timer with an unlimited number of states. The residual queue is estimated by using knowledge of the round trip delay in the local network. With such knowledge, the controller at the network edge can count how many acknowledgments are released over a time interval of $\tau_{max}$. The new estimate of the residual queue size and the effective queue size are respectively:

$$q_{es}^{est2}(t) = \sum_{t'} (\text{\# acks released at time } t') \times \text{packet size} \quad (18)$$

where $t - \tau_{max} \leq t' < t$, $$q_{est2}^*(t) = q(t) + q_{res}^{est2}(t). \quad (19)$$

The above computation can be performed by using a timer 501 and a register array 503 to hold the timestamp $\hat{t}+\tau_{max}$ for each released acknowledgment 511A, 513A, 515A released at times $\hat{t}_1$, $\hat{t}_2$, and $\hat{t}_3$ respectively. The estimate $q_{res}^{est2}(t)$ is then equal to the number of registers having timestamps larger than t, in this example 513B, 515B, counted in box 591. Those registers 511B with timestamps smaller than the current time can be used to hold the new timestamps for future released acknowledgments.

Unlike the previous embodiment, this embodiment cannot estimate the residual queue size and effective queue size precisely. However, the error in the estimate can be bounded as follows (in the case of persistent sources):
Lemma 2

$$q_{est2}^*(t) \geq \frac{1}{2} q^*(t), \quad (20)$$

$$q_{est2}^*(t) \leq q^*(t) + \pi(t) \quad (21)$$

Figure 7B:
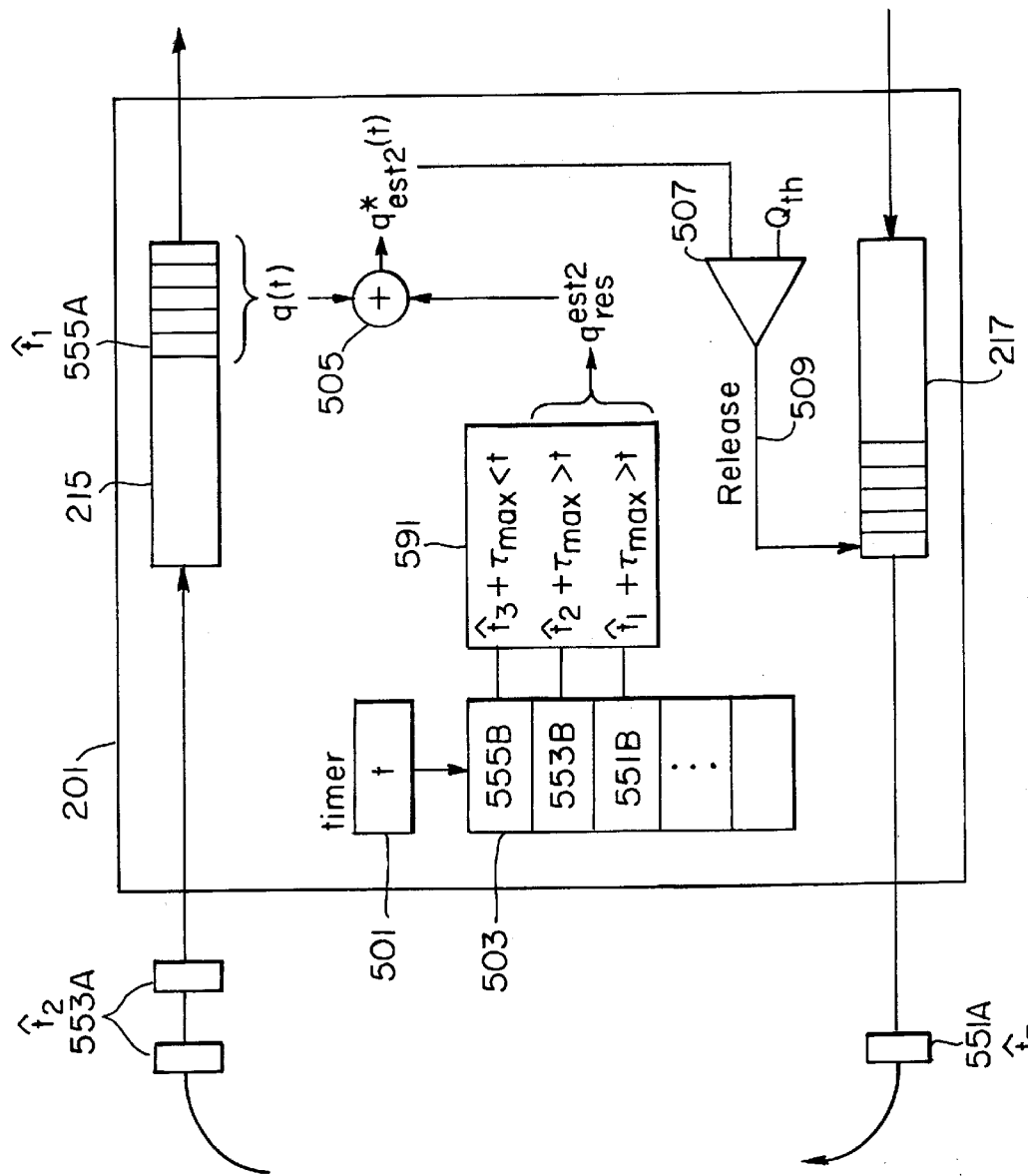
FIG. 7B is a schematic diagram of the same embodiment depicted in FIG. 7A, but illustrating further concepts.

FIG. 7B depicts the same embodiment as FIG. 7A, but illustrates further concepts. First recall that the residual queue size at time t is by definition the amount of data contained in packets in transit plus packets requested by acknowledgments in transit at time t. Now note that any packet 553A that is in transit at time t between the source and the network edge must be triggered by some acknowledgment released between time $t-\tau_{max}$ and t. Moreover, an acknowledgment 551A in transit at time t between the network edge and the source must have been released between time $t-\tau_{max}$ and t, and recorded in the register 551B. Since a single acknowledgment released from the network edge will cause a TCP source to send at most two packets as in this case, the residual queue size can be at most twice its estimate, or $q_{res}^{est2}(t) \geq \frac{1}{2} q_{res}(t)$. In the example of FIG. 7B, one acknowledgment has triggered the release of two packets 553A. Note that there is just one corresponding timestamp 553B in the register file 503. Since the actual queue $q(t) \geq 0$, we have $$q_{est2}^*(t) = q(t) + q_{res}^{est2}(t) \geq \frac{1}{2} q(t) + \frac{1}{2} q_{res}(t) = \frac{1}{2} q^*(t),$$

yielding Eq. 20.

When the LAN round-trip time is $\tau_{max}$, every acknowledgment released between $t'\tau_{max}$ and t either is in transit at time t or triggers at least one packet that is in transit at time t. When the round-trip time is less than $\tau_{max}$, the estimate of the residual queue will include an extra number of some of the early packets 555A since their expected timestamps 555B have not yet expired when they enter the actual queue. Hence, $q_{res}^{est2}(t) \leq q_{res}(t) + \pi(t)$ and consequently $q_{est2}^*(t) \leq q^*(t) + \pi(t)$.

Incorporating this estimate of effective queue size into the basic scheme, i.e., an acknowledgment is released from the network edge to the source only if $q_{est2}^*(t) < Q_{th}$, we obtain the following performance bounds for Embodiment 2 (in the case of persistent sources) using Theorems 1 and 2:

1. The maximum actual queue size is: $q(t) \leq 2 Q_{th}$,
2. The guaranteed rate is: $R \geq Q_{th}/\tau_{max}$.

Compared with Embodiment 2, Embodiment 3 achieves the same lower bound on the guaranteed rate but twice the upper bound on the actual queue size when the sources are persistent. We can interpret the extra $Q_{th}$ in the queue bound as caused by the lack of knowledge on the TCP source behavior. Note also that from the above argument, $q_{res}^{est2}(t) \leq Q_{th}$ for all time t. Thus, the number of registers needed to compute $q_{res}^{est2}(t)$ is no more than $Q_{th}$/packet size.

Embodiment 4: One Timer with Limited Number of States

Figure 8:
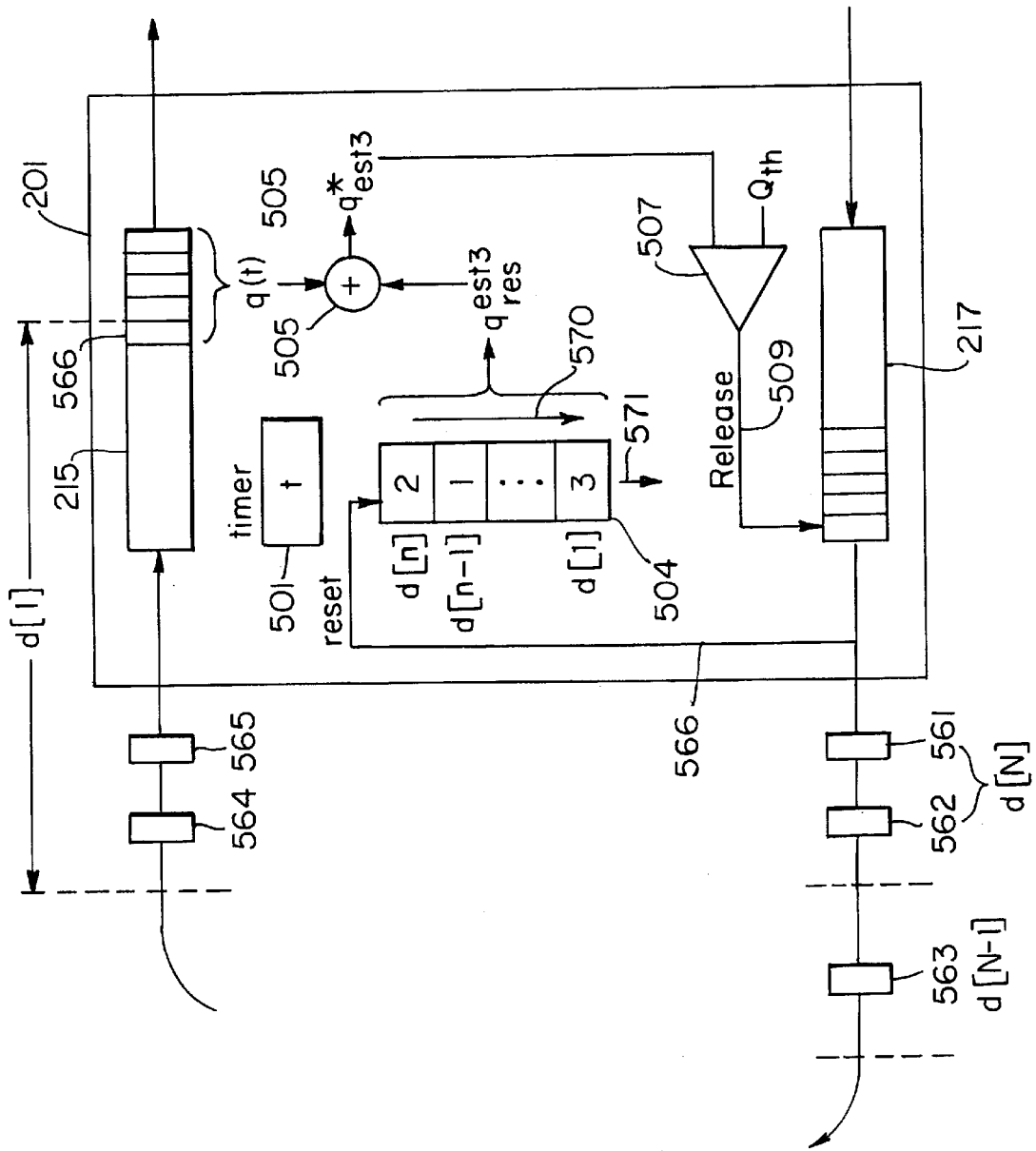
FIG. 8 is a schematic diagram of a preferred embodiment of the present invention for a general network, having no knowledge of the TCP version, and having one timer with a limited number of states.

FIG. 8 is a schematic diagram of a preferred embodiment similar to that depicted in FIGS. 7A and 7B, for use within a general network, having no knowledge of the TCP version, and having one timer with a limited number of states. In Embodiment 3, the number of acknowledgments released during a time interval of $\tau_{max}$, is precisely counted and, consequently, one register is used to keep track of the timestamp for each such acknowledgment. To further reduce implementation complexity, Embodiment 4 uses similar ideas but uses only a fixed number N>1 of registers 504 with one timer. The key idea is to estimate the residual queue size by approximating the number of acknowledgments released over a time interval of $\tau_{max}$.

In Embodiment 4, each of N states, denoted by d[n] for n=1, . . . , N, holds the number of acknowledgments that are released by the network edge during some consecutive time interval of duration $\tau_{max}/N$, with n=N corresponding to the current time interval. When an acknowledgment is released, the value of the first state d[N] is incremented by one via signal 566. At the beginning of each time interval $\tau_{max}/N$, the value of each state is passed to the state of the previous time interval (d[n−1]−d[n], for 1<n≤N), as indicated by arrow 570, and d[N] is reset to zero. The value of d[1] is discarded, as indicated by arrow 571.

Packets and acknowledgments are shown with their corresponding intervals. For example, acknowledgments 561 and 562 were released in the current interval and so they are associated with d[N] which is shown in register file 504 having the value 2. Similarly, ack 563 is was released during the previous interval and so is associated with d[N−1]. Packets 564 and 565, and 566 (in the packet queue 215) have been transmitted in response to acknowledgments released during the oldest interval and so are associated with d[1], which holds a count of 3.

The residual and effective queue size estimates in this scheme are as follows:

$$q_{es}^{est3}(t) = \sum_{n=1}^{N} d[n] \times \text{packet size}, \quad (22)$$

$$q_{est3}^*(t) = q(t) + q_{es}^{est3}(t) \quad (23)$$

Note that the above estimate of the residual queue size at time t is an underestimate of the packet size times the number of acknowledgments released between time $t-\tau_{max}$ and $t$, i.e., $$\sum_{n=1}^{N} d[n] \le \sum_{t'} \text{\# acks released at time } t' \quad (24)$$

where $t-\tau_{max} \le t' < t$.

Lemma 3

The error bounds on the estimate of the effective queue size are (in the case of persistent sources):

$$q^*_{est3}(t) \ge \frac{1}{4} q^*(t) \text{ whenever } q^*(t) \ge 4 Q_{th}, \quad (25)$$

$$q^*_{est3}(t) \le q^*(t) + \pi(t). \quad (26)$$

Proof:

According to the basic scheme, an acknowledgment is only released when $q^*_{est3}(t) < Q_{th}$, and thus $q_{res}^{est3}(t) \le Q_{th}$. This means that the packet size times the number of acknowledgments released over any time interval of duration $\tau_{max}/N$ is at most $Q_{th}$. Since $q_{res}^{est3}(t)$ can at most underestimate $q_{res}^{est2}(t)$ by $Q_{th}$, $\Sigma(\text{\# acks released at time } t') \times (\text{packet size}) \le q_{res}^{est3}(t) + Q_{th}$, where $t-\tau_{max} \le t' < t$.

By the same argument as in the proof of Lemma 2, since each acknowledgment released will cause a TCP source to send at most two packets, the residual queue size is at most $$q_{res}(t) \le 2 \sum_{t'} (\text{\# of acks released at time } t') \times (\text{packet size}) \le 2 \, q_{res}^{est3}(t) + Q_{th}$$

where $t-\tau_{max} \le t' < t$

To prove Eqn. 25, suppose $q^*(t) = 4Q_{th} + k$, where $k \ge 0$. Also, $q_{res}(t) = q^*(t) - q(t) = 4Q_{th} - q(t) + k$. Substituting the inequality 16 into the previous equation yields $$q_{res}^{est3}(t) \ge Q_{th} - \frac{q(t)}{2} + \frac{k}{2}.$$

Therefore, $$q^*_{est3}(t) \ge q_{res}^{est3}(t) + q(t) \ge Q_{th} + q(t)/2 + k \ge Q_{th} + k/4 = q^*(t)/4.$$

To prove Eqn. 26, whenever the LAN round trip time is $\tau_{max}$, by the same argument as in the proof of Lemma 2, the residual queue size $q_{res}(t)$ plus the number of early packets $\pi(t)$ is always at least as large as the packet size times the number of acknowledgments recorded in the N registers. From Eqn. 24, we have $q_{res}^{est3}(t) \le q_{res}(t) + \pi(t)$, and thus $q^*_{est3}(t) \le q^*(t) + \pi(t)$.

Using Theorems 1 and 2, the following performance bounds can be derived for Embodiment 4 (in the case of persistent sources):

1. The maximum actual queue size is: $q(t) \le 4 Q_{th}$,
2. The guaranteed rate is: $R \ge Q_{th}/\tau_{max}$.

In the worst case, using a larger N in Embodiment 4 will not bring a better bound than a smaller N. However, in most cases, a larger N will give us a better performance. A larger N means that the approximation to the number of acknowledgments released over a time interval $\tau_{max}$ becomes more accurate, thus bringing the performance bounds of Embodiment 4 closer to Embodiment 3.

Embodiment 5: Without Knowledge of Delay

Figure 9:
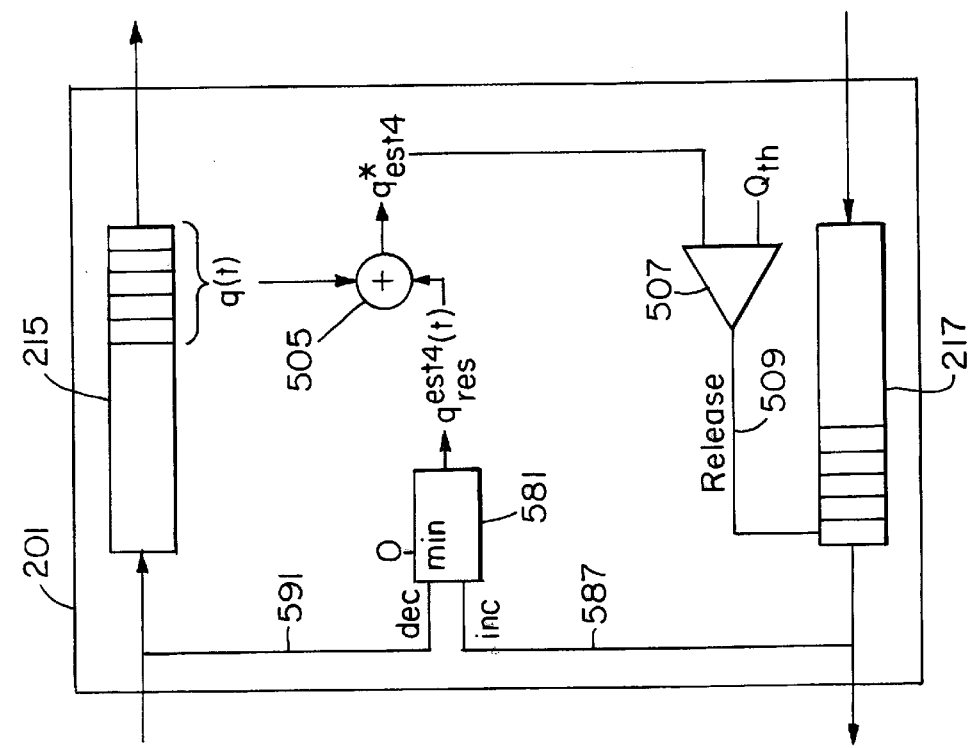
FIG. 9 is a schematic diagram of a preferred embodiment of the present invention for a general network, having no knowledge of the TCP version, and having no knowledge of the round trip delay.

FIG. 9 is a schematic diagram of a preferred embodiment for a general network where the maximum LAN round trip delay $\tau_{max}$ is not known. In this case, the estimate of the residual queue size $q_{res}^{est4}(t)$ is computed by incrementing $q_{res}^{est4}(t)$ by one when an acknowledgment is released and decrementing it by one when a packet arrives at the network edge. This technique tends to underestimate the residual queue. We limit the residual queue estimate error by preventing $q_{res}^{est1}(t)$ from becoming negative.

The following pseudocode describes this embodiment:

If an acknowledgment is released: (27)

$q_{res}^{est4}(t) - q_{res}^{est4}(t) + 1$

If a packet is received:

$q_{res}^{est4}(t) - q_{res}^{est4}(t) - 1$

If $q_{res}^{est4}(t) < 0$ $q_{res}^{est4}(t) - 0$ $q^*_{est4} = q(t) + q_{res}^{est4}(t)$ FIG. 9 schematically portrays this embodiment. A counter 581 is incremented via control 587 when an acknowledgment is released. The counter 581 is decremented via control 591 when a packet arrives, however, the counter is not allowed to go below zero. The value of the counter 581 is then taken as the residual queue estimate $q_{res}^{est4}(t)$.

Since every acknowledgment triggers the release of at least one packet from the source, this estimation technique always guarantees the bound $q_{res}^{est4}(t) \le q_{res}(t)$. Using Theorem 2 we can prove that the guaranteed rate is $R \ge Q_{th}/\tau_{max}$ (we assume $\tau_{max}$ is finite though it is unknown). However, there is no constant-factor lower bound for $q_{res}^{est4}(t)$ with respect to $q_{res}(t)$. In fact, it is not hard to construct a worst-case scenario in which $q_{res}^{est4}(t) = 0$ and $q_{res}(t)$ is unbounded. In summary, for Embodiment 5, 1. The worst case queue size is unbounded,
2. The guaranteed rate is: $R \ge Q_{th}/\tau_{max}$.

Thus, in the present embodiment, some throughput guarantee is still possible even when there is no knowledge of the LAN round-trip time. However, because of 1) the uncertainty in the TCP source model, and 2) the lack of any knowledge of the round-trip delay time, the worst-case queue size is unbounded. In fact, it is not hard to show that no other scheme under these two conditions can ensure both a queue bound and a non-zero guaranteed rate.

Other Packet-Counting Embodiments

The idea of counting packets arriving at the network edge can also be applied to Embodiments 3 and 4, which rely on a knowledge of T,. Under the original Embodiments 3 and 4 (FIGS. 7A and 8 respectively), a temporarily idle TCP source can continue to receive acknowledgments as long as the acknowledgment bucket is non-empty. The basic improvement allows the residual queue size to be reduced only when some packet has been previously received at the network edge. Thus, when the TCP source becomes active again, it will not send a big burst of packets to the network edge. Embodiments 3 and 4 thus improved are more robust and reduce the burstiness of traffic due to non-greedy sources.

Figure 10:
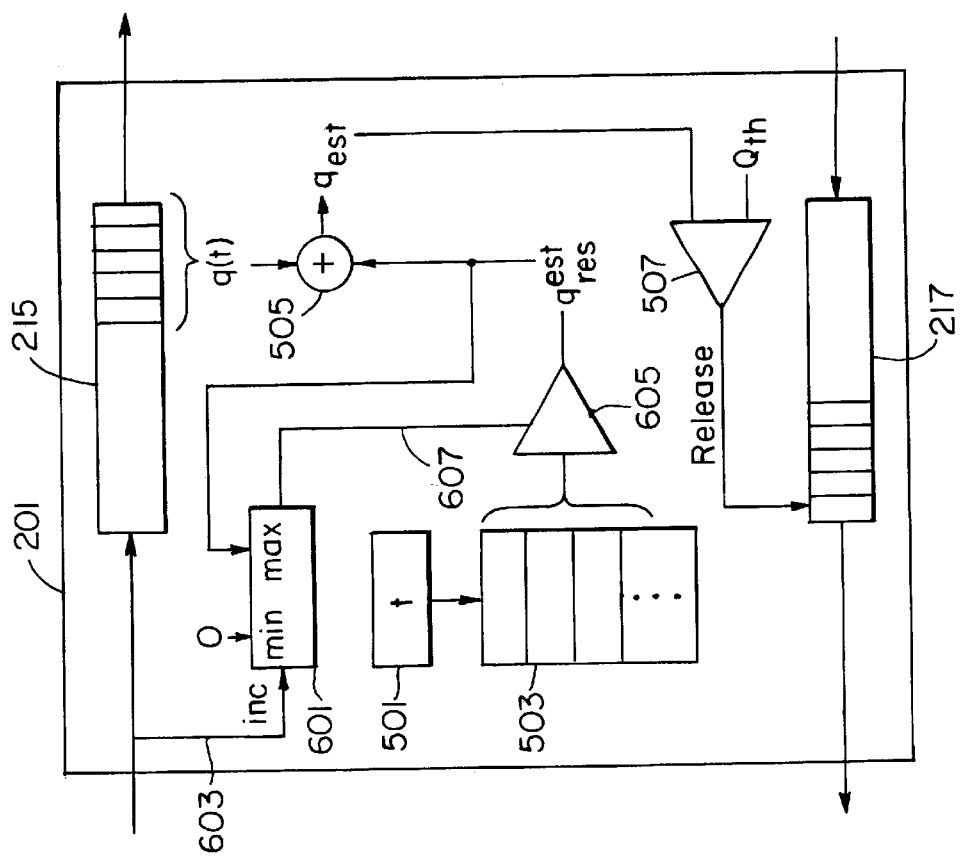
FIG. 10 is a schematic diagram illustrating modifications in which counting of packets is applied to the preferred embodiments of FIGS. 7–8.

FIG. 10 is a schematic diagram illustrating the improvement for Embodiment 3 (FIG. 7A). Specifically, a counter register 601 is maintained and is incremented by one via signal 603 every time a packet arrives at the edge router. The value 607 of the counter is never allowed to be higher than the estimate of the residual queue. Decrementing of the residual queue size according to either of Embodiments 3 or 4. Recall that in the original Embodiment 3, for example, the residual queue size is decremented when timestamps associated with released acknowledgments become old.

However, if the counter's value is zero, then decrementing of the residual queue size is delayed until the counter is greater than zero, i.e., until packets have arrived. This is indicated in FIG. 10 by gate 605 which inhibits the decremental changes of the residual queue size $q_{res}^{est}(t)$. Finally, when the counter value 607 is greater than zero, the counter and the residual queue are decremented by the same amount. The counter is not decremented below zero.

Large Network Delays

Figure 11:
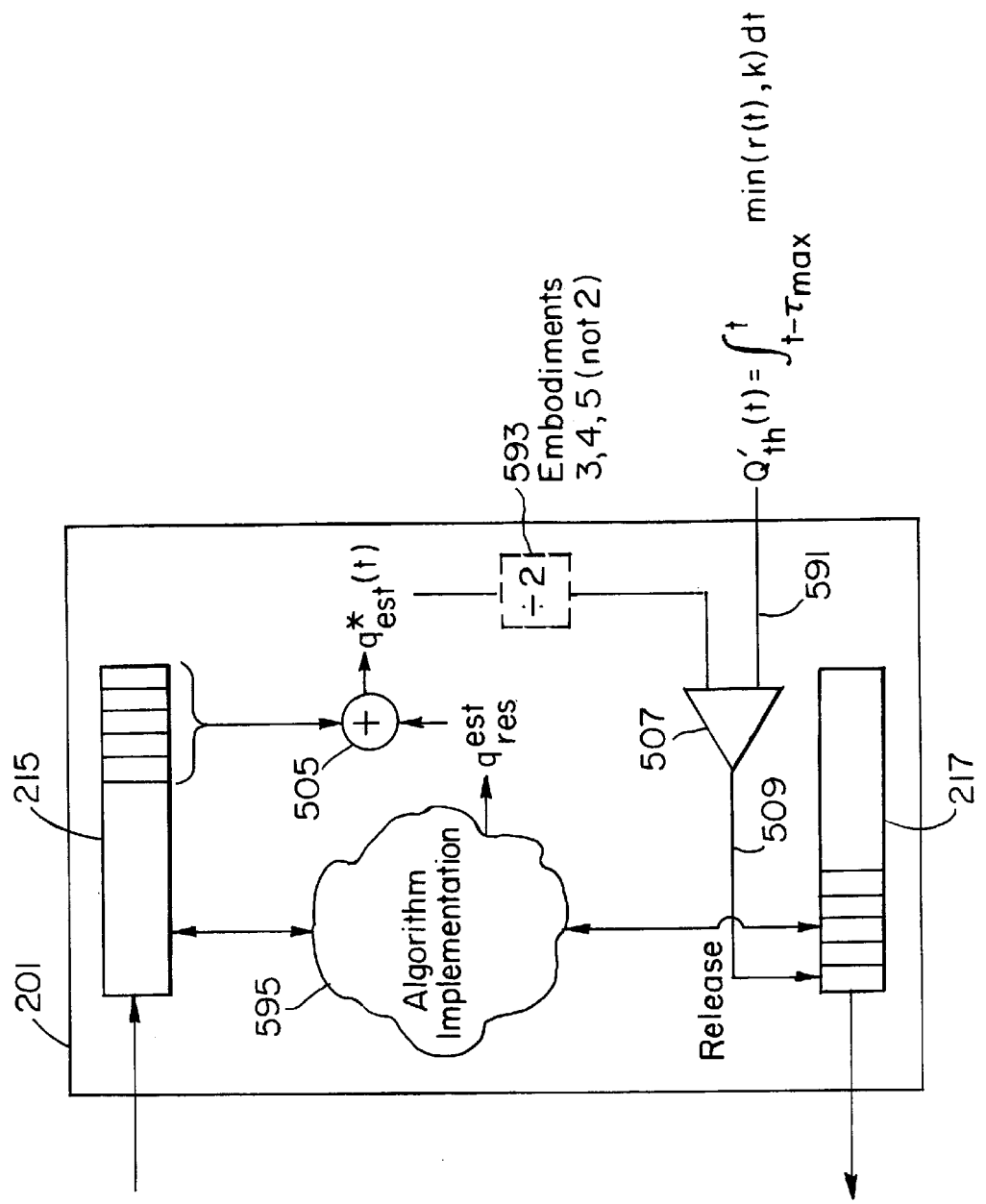
FIG. 11 is a schematic diagram showing modifications to the embodiments of FIGS. 6–9 where there are large network delays.

FIG. 11 is a schematic diagram of a preferred embodiment showing modifications to Embodiments 2–4 where there is a large network delay. In Embodiments 2–4, whose algorithms are represented collectively by reference 595, the guaranteed rate R and the maximum queue size $q_{max}$ are related by the constant $\tau_{max}(q_{max}/R \tau_{max})$. When this constant is too large, either the guaranteed rate must be low or the queue bound must be large. For large propagation delays it is no longer possible for these schemes (or any other schemes) to guarantee both a small queue bound and a large guaranteed rate.

This problem can be partially overcome by adding information about the available bandwidth r(t) in the BC network. Recall that r(t) is the rate at which the edge can transmit packets in its buffer to the BC network. Although a small queue bound and a large guaranteed rate cannot both be guaranteed, the average queue size can be kept small while maintaining high average throughput. Furthermore, this can be done while still maintaining worst case bounds. The more stable r(t) is, the better the performance can be.

The key idea is to make the queue threshold $Q_{th}$ 591 dynamic. This can be applied to Embodiments 2–5. The new threshold $Q'_{th}(t)$ is dependent on the available bandwidth r(t):

$$Q'_{th}(t) = \int_{t-\tau_{max}}^{t} \min(r(t), k) dt. \quad (28)$$

The constant k in equation (28) puts an upper bound on the dynamic queue threshold. The static queue threshold $Q_{th}$ in the original schemes is now replaced by $Q'_{th}(t)$. Furthermore, in Embodiments 3, 4 and 5 (but not in Embodiment 2), we also change the estimate of the effective queue size so that it only considers half of the actual queue size, indicated by divider 593:

$$q_{est}^*(t) = \frac{1}{2} q(t) + q_{res}^{est}(t) \quad (29)$$

The effective queue size estimate must be redefined to ensure that the queue q(t) reaches steady state when the available bandwidth r(t) and round-trip delay τ are in steady state.

The modified embodiments with dynamic thresholds have degraded worst-case but improved steady-state performances compared to their corresponding static embodiments. By steady state, we mean that during a time interval, the following conditions are met:

1. The available bandwidth r(t) is constant.
2. The round-trip delay τ is the constant $\tau_{max}$.
3. The number of packets sent from the source per acknowledgment received at the network edge is a constant between 1 and 2.

Under these conditions, it is possible to bound the actual queue size q(t) and the throughput. Let $q_{ss}$ be the maximum queue size when the system is in steady state as defined above. Likewise, let $R_{ss}$ denote the guaranteed rate when the system is in steady state. Note that the steady-state performance of the static algorithms can be just as bad as the worst-case performance ($q_{ss}=q_{wc}$, $R_{ss}=P_{wc}$). Table 1 compares the worst-case and the steady-state performance of the modified algorithms with dynamic queue thresholds.

TABLE 1

Performance Bounds with Dynamic Threshold $Q'_{th}(t)$

| Dynamic Threshold $Q'_{th}(t)$ | Queue Bound $q_{wc}$ | Guaranteed Rate $R_{wc}$ | Ratio $R_{wc}/q_{wc}$ | Steady State Queue $q_{ss}$ | Steady State Rate $R_{ss}$ | Ratio $R_{ss}/q_{ss}$ |
|---|---|---|---|---|---|---|
| Embodiment 2 | $k\tau_{max}$ | k/2 | $\frac{1}{2}\tau_{max}$ | 0 | k | ∞ |
| Embodiment 3 | $2k\tau_{max}$ | k/2 | $\frac{1}{4}\tau_{max}$ | $k\tau_{xma}$ | k | $1/\tau_{max}$ |
| Embodiment 4 | $4k\tau_{max}$ | k/2 | $\frac{1}{8}\tau_{max}$ | $Nk\tau_{max}/(N-1)$ | k | $(N-1)/N\tau_{max}$ |
| Embodiment 5 | — | k/2 | 0 | $k\tau_{max}$ | k | $1/\tau_{max}$ |

Aggregate Traffic

The discussion so far has been focused on regulating the traffic of only one TCP connection. Alternatively, in the case of Embodiments 3–5, it is quite simple to apply them to regulate aggregate traffic.

Figure 12A:
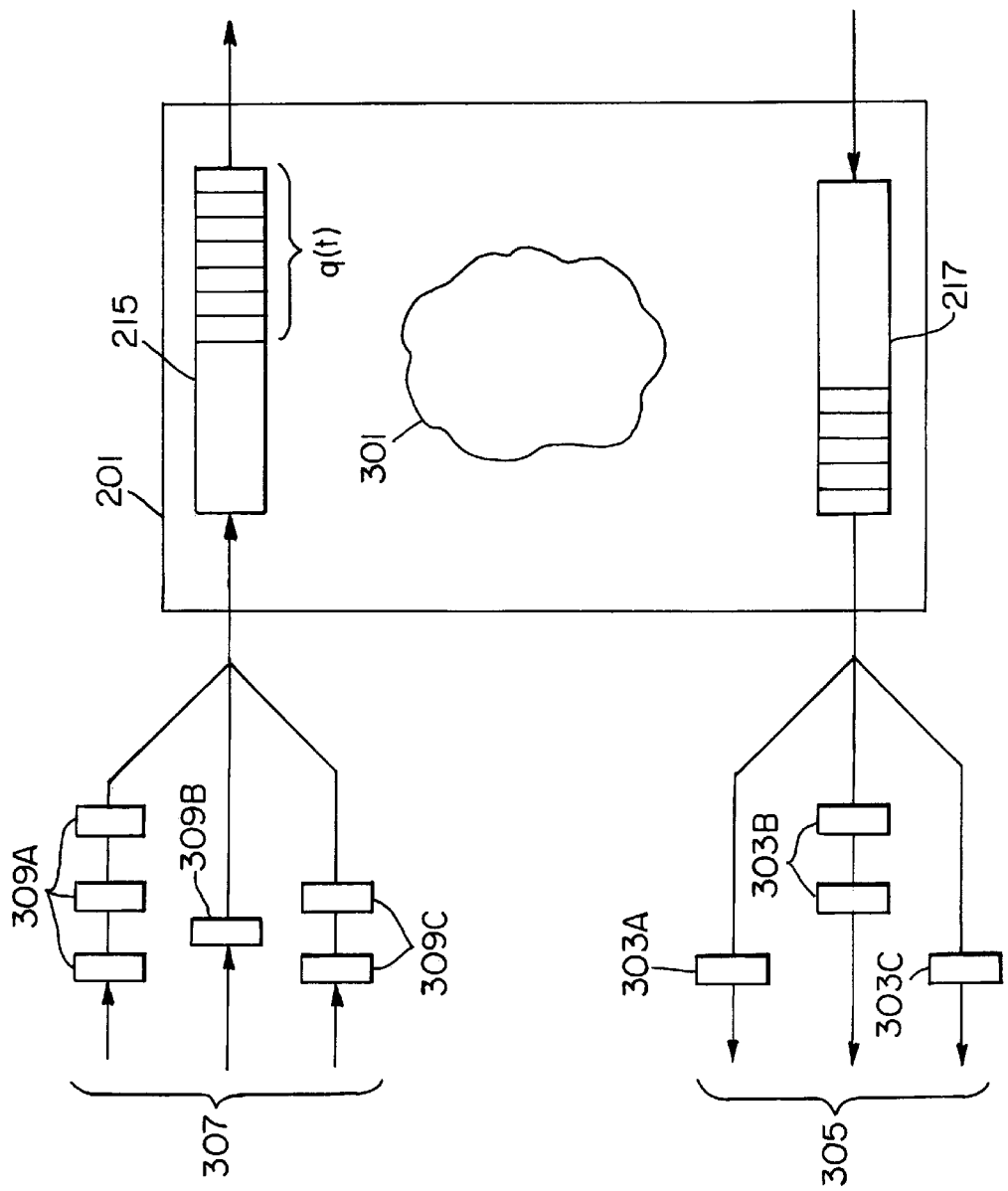
FIGS. 12A and 12B are schematic diagrams depicting preferred embodiments of the present invention where multiple TCP flows are merged into one FIFO queue, using one or many acknowledgment buckets, respectively.

FIG. 12A is a schematic diagram of a preferred embodiment where different TCP flows 307 are merged into one FIFO queue 215. The objective is to minimize the total FIFO queue size while maximizing the total throughput. This can be achieved by treating all the packets for all the connections in the same way. The actual queue size q(t) is the total number of packets in the FIFO queue 215; the residual queue size is the sum of all the packets and acknowledgments that are in transit according to the algorithm used at reference 301. The algorithms are the same except that all the packets are considered collectively.

Figure 12B:
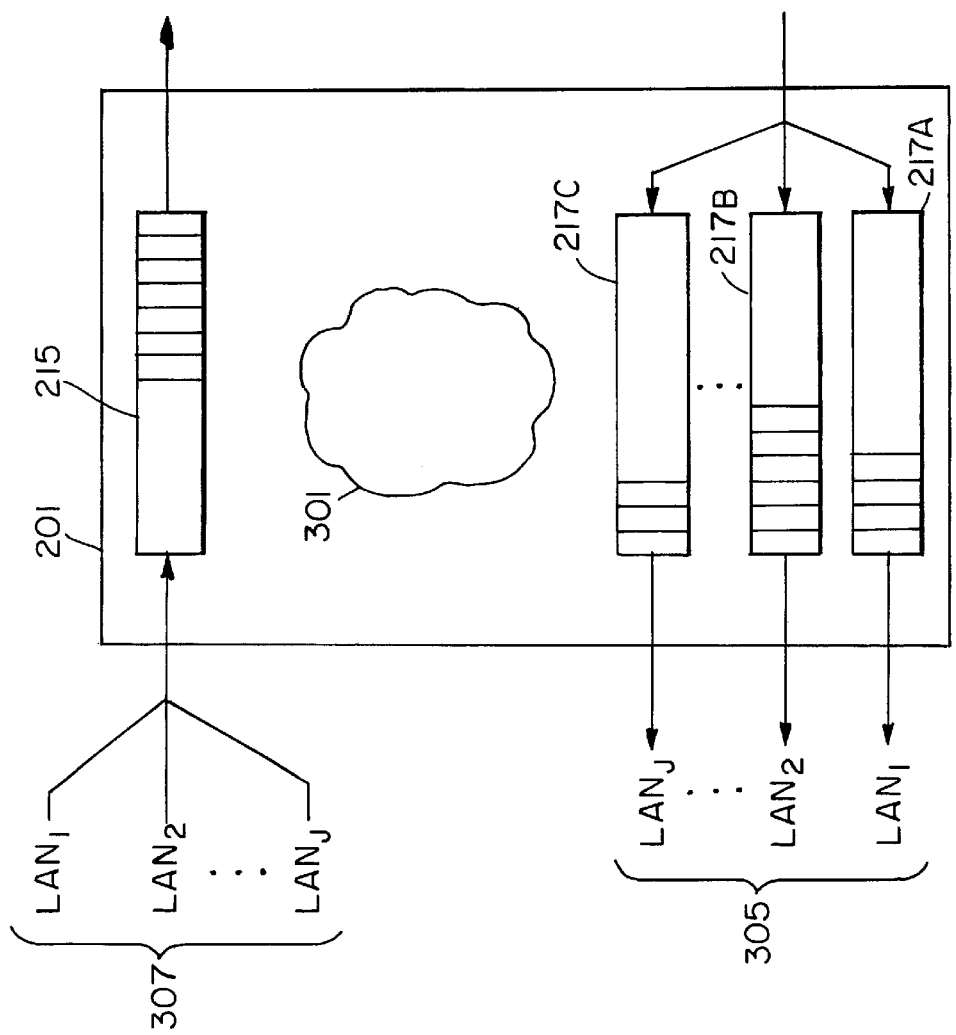

Finally, in order to ensure fairness among the different connections, FIG. 12B shows that the acknowledgments for each TCP connection are preferably kept in separate buckets 217A–217C and are released in a round-robin fashion. In other words, when the network edge 201 wants to release an acknowledgment, it looks for the next non-empty bucket and releases an acknowledgment from that bucket. In this fashion similar performance bounds for the cumulative queue and throughput can be achieved, while treating all the connections fairly.

Acknowledgment Bucket Implementation

Due to the sequential nature of acknowledgment sequence numbers, it is redundant to actually store every acknowledgment number. Rather, for every connection, only the highest acknowledgment number received for each sequence, as well as the sequence number of the last acknowledgment released need be stored. This is because if a packet is missed, the destination, upon receiving further packets in a sequence, continues to send acknowledgments with the number of the lowest missing packet. Thus, the presence of a particular number guarantees that all packets having lower sequence numbers have arrived at the destination. Duplicate acknowledgments caused by missing packets can be ignored. The acknowledgment bucket simply needs to keep track of the last number released, and can compose and release acknowledgments sequentially up to the number stored in the bucket.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for regulating flow through a network node in a system adhering to a protocol in which data packets are forwarded from sources to destinations and forwarding of successive data packets from the sources is dependent on receipt of acknowledgments from the destinations, said method comprising the steps of:
   receiving data packets from sources, buffering the packets in a packet buffer and forwarding the packets toward destinations;
   withholding acknowledgments arriving from the destinations to inhibit the transmission of further packets from the sources; and
   releasing the acknowledgments to the sources to allow the transmission of further packets from the sources such that data packets are buffered in the sources to avoid overflow of the packet buffer due to bandwidth limitations toward the destinations.

2. The method of claim 1 wherein the network node is connected between a bandwidth constrained network (BCN) having destinations and a local area network (LAN) having sources.

3. The method of claim 2 wherein the protocol is transmission control protocol (TCP).

4. The method of claim 2 wherein the BCN operates in asynchronous transfer mode (ATM).

5. The method of claim 4 wherein a transmission rate of the BCN is returned upon request.

6. The method of claim 5, further comprising:
   maintaining TCP source states by observing TCP traffic through the node;
   predicting behavior of TCP sources based on traffic observations; and
   translating a known transmission rate of the BCN to a timed sequence of acknowledgments releases based on the predicted behavior.

7. A method claim 2, further comprising:
   maintaining an estimate of effective queue size including data buffered between the BCN and LAN and residual data packets where the residual data packets are those data packets that have been requested but have not yet been received at the node;
   releasing an acknowledgment if the effective queue size is less than a threshold.

8. A method as claimed in claim 7, wherein TCP versions of sources are known, further comprising:
   maintaining TCP source states by observing TCP traffic through the node to keep account of an amount of data requested through acknowledgment releases;
   calculating the residual queue size at time t as the amount of data requested up to time t, less an amount of data received from the source by time t; and
   calculating the estimate of effective queue size at time t by adding a value based on the actual queue size at time t, to the residual queue size at time t.

9. A method as claimed in claim 7, further comprising:
   calculating an estimate of residual queue size at time t by counting acknowledgments released during an interval from $(t-\tau_{max})$ to t, where $\tau_{max}$ is a maximum round trip delay in the LAN; and
   calculating the estimate of effective queue size at time t by adding a value based on the actual queue size at time t, to the estimate of residual queue size at time t.

10. A method as claimed in claim 7, further comprising:
    calculating an estimate of residual queue size at time t by counting acknowledgments released during N consecutive intervals of duration $\tau_{max}/N$ ending at time t for some integer N, and maintaining each of said counts for a duration of $\tau_{max}$, where $\tau_{max}$ is a maximum of round trip delay in the LAN; and
    calculating the estimate of effective queue size at time t by adding a value based on the actual queue size at time t, to the estimate of residual queue size at time t.

11. A method as claimed in claim 7, further comprising:
    initializing an estimate of residual queue size;
    incrementing by one the estimate of residual queue size when an acknowledgment is released;
    decrementing by one the estimate of residual queue size when a packet arrives; and
    calculating the estimate of effective queue size at time t by adding a value based on the actual queue size at time t, to the estimate of residual queue size at time t.

12. A method as claimed in claim 11, wherein the estimate of residual queue size is not decremented if its value is 0.

13. A method as claimed in claim 7, wherein the threshold changes dynamically and is dependent on the available bandwidth of the BCN.

14. A method as claimed in claim 7 wherein the regulated traffic is aggregated from a plurality of TCP connections, wherein the actual queue size is a count of all packets in a FIFO queue, residual queue size is a count of all packets which have been requested from all sources and which have not yet arrived at the FIFO queue, effective queue size is the sum of the actual queue size and residual queue size, and wherein fairness is ensured among the different connections.

15. A method as claimed in claim 14 wherein the acknowledgments for each TCP connection are kept in separate buckets and are released in a round-robin fashion.

16. The method of claim 1 wherein withholding acknowledgments further comprises storing acknowledgment numbers in an acknowledgment bucket.

17. The method of claim 16 wherein only highest sequence numbers and sequence numbers of last acknowledgments released are stored.

18. A system for regulating flow in a network edge between networks in a system adhering to a protocol in which data packets are forwarded from sources to destinations and forwarding of successive data packets from the sources is dependent on receipt of acknowledgments from the destinations, comprising:
    a packet buffer in which data packets received from the sources are stored, and from which the packets are forwarded toward the destinations; and
    an acknowledgment bucket in which acknowledgments arriving from the destinations are stored, such that the acknowledgments are withheld from the sources to inhibit the transmission of further packets from the sources and are subsequently released to the sources to allow the transmission of further packets from the sources such that data packets are buffered in the sources to avoid overflow of the packet buffer due to bandwidth limitations toward the destinations.

19. The system of claim 18 wherein the network edge connects a bandwidth constrained network (BCN) having destinations to a local area network (LAN) having sources.

20. The system of claim 19 wherein the protocol is transmission control protocol (TCP).

21. The system of claim 19 wherein the BCN operates in asynchronous transfer mode (ATM).

22. The system of claim 21 wherein a transmission rate of the BCN is returned upon request.

23. The system of claim 22, further comprising:

an observer which maintains TCP source states by observing TCP traffic through the network edge, such that behavior of the TCP sources is predicted based on traffic observations; and a translator which translates a known transmission rate of the BCN to a timed sequence of acknowledgments releases based on the predicted behavior.

24. The system of claim 19, wherein:

an estimate is maintained of effective queue size including data buffered between the BCN and LAN and residual data packets where the residual data packets are those data packets that have been requested but have not yet been received at the network edge, such that an acknowledgment is released from the acknowledgment bucket if the effective queue size is less than a threshold.

25. The system of claim 24 wherein the regulated traffic is aggregated from a plurality of TCP connections, wherein the actual queue size is a count of all packets in a FIFO queue, residual queue size is a count of all packets which have been requested from all sources and which have not yet arrived at the FIFO queue, effective queue size is the sum of the actual queue size and residual queue size, and wherein fairness is ensured among the different connections.

26. The system of claim 25 further comprising:

a plurality of acknowledgment buckets corresponding to the TCP connections such that the acknowledgments for each TCP connection are kept in separate buckets and are released in a round-robin fashion.

27. The system of claim 18 wherein acknowledgments are stored in the acknowledgment bucket by storing sequence numbers associated with the acknowledgments.

28. The system of claim 27 wherein only highest sequence numbers and sequence numbers of last acknowledgments released are stored.

* * * * *